United States Patent
Oshima

(10) Patent No.: US 7,535,554 B2
(45) Date of Patent: May 19, 2009

(54) DISPLACEMENT MEASURING METHOD, DISPLACEMENT MEASURING INSTRUMENT, DISPLACEMENT MEASURING TARGET AND CIVIL STRUCTURE

(75) Inventor: Yoshinobu Oshima, Kyoto (JP)

(73) Assignee: Kyoto University, Kyoto (JP)

( * ) Notice: Subject to any disclaimer, the term of this patent is extended or adjusted under 35 U.S.C. 154(b) by 0 days.

(21) Appl. No.: 11/572,952

(22) PCT Filed: Jul. 15, 2005

(86) PCT No.: PCT/JP2005/013179

§ 371 (c)(1),
(2), (4) Date: Jun. 12, 2007

(87) PCT Pub. No.: WO2006/011386

PCT Pub. Date: Feb. 2, 2006

(65) Prior Publication Data

US 2008/0030710 A1 Feb. 7, 2008

(30) Foreign Application Priority Data

Jul. 30, 2004 (JP) ............................. 2004-223236

(51) Int. Cl.
*G01C 3/08* (2006.01)
(52) U.S. Cl. ................ 356/4.04; 356/4.01; 356/4.1; 356/141.1; 356/141.2
(58) Field of Classification Search ....... 356/3.01–3.15, 356/4.01–4.1, 5.01–5.15, 6–22, 141.1–141.5, 356/139.01–139.1, 152.1
See application file for complete search history.

(56) References Cited

U.S. PATENT DOCUMENTS

| | | | | |
|---|---|---|---|---|
| 5,898,490 A | * | 4/1999 | Ohtomo et al. | 356/141.3 |
| 6,043,889 A | * | 3/2000 | Garner | 356/614 |
| 2004/0223139 A1 | * | 11/2004 | Vogel | 356/141.1 |

FOREIGN PATENT DOCUMENTS

| JP | 08-327400 A | | 12/1996 |
|---|---|---|---|
| JP | 2008327400 | * | 12/1996 |
| JP | 2000-074636 A | | 3/2000 |
| JP | 2002-131018 A | | 5/2002 |
| JP | 2002-257545 A | | 9/2002 |
| JP | 2003-287415 A | | 10/2003 |

* cited by examiner

*Primary Examiner*—Thomas H Tarcza
*Assistant Examiner*—Luke D Ratcliffe
(74) *Attorney, Agent, or Firm*—Darby & Darby PC

(57) ABSTRACT

A target having a reflective part for a laser beam is located at the measuring object position of a bridge girder in such a way that the reflective part includes with respect to the displacement measuring direction and a laser rangefinder is located at the pier. A laser beam projected from the laser rangefinder along the longitudinal direction of the bridge girder impinges on the reflective part and the reflected light of the laser beam returned from the reflective part in the direction generally parallel with the incident direction is received by the laser rangefinder so as to detect variation in the distance from the laser rangefinder to the laser beam reflecting position of the reflective part. Displacement of the bridge girder in the displacement measuring direction is measured utilizing correlation between the detected variation and the displacement of the measuring object position in the displacement measuring direction.

9 Claims, 17 Drawing Sheets

DISPLACEMENT MEASURING METHOD, DISPLACEMENT MEASURING INSTRUMENT, DISPLACEMENT MEASURING TARGET AND CIVIL STRUCTURE

CROSS-REFERENCE TO PRIOR APPLICATIONS

This is a U.S. national phase application under 35 U.S.C. §371 of International Patent Application No. PCT/JP2005/013179, filed Jul. 15, 2005, which claims the benefit of Japanese Application No. 2004-223236, filed Jul. 30, 2004, both of which are incorporated by reference herein. The International Application was published in Japanese on Feb. 2, 2006 as International Publication No. WO 2006/011386 A1 under PCT Article 21(2).

TECHNICAL FIELD

The present invention relates to a displacement measuring method of a measuring object, such as a bridge, or a mountain.

RELATED ART

There exist contact-type and noncontact-type methods of measuring the displacement of a civil structure such as a bridge. As for the contact-type displacement measuring method, for example, a method of measuring a displacement in the vertical direction is proposed (see Patent Document 1) in which the displacement is measured by putting an extendible bar gauge to contact with a displacement measuring position of the superstructure work of a bridge. As for the noncontact-type displacement measuring method, a method of measuring the displacement of a target is proposed (see Patent Document 2), in which a laser beam projected from a laser rangefinder located on the ground level impinges perpendicularly on a reflective part of the target located at a displacement measuring position of the civil structure, and a reflected light reflected from the reflective part in the incident direction of the laser beam is received by the laser rangefinder. Furthermore, a noncontact-type distance measuring method is also known (see Patent Document 3), in which a distance is measured by projecting a laser beam on a target having a shape of staircase.

Patent Document 1: JP-A No. 2003-287415
Patent Document 2: JP-A No. 2002-257545
Patent Document 3: JP-A No. 2002-131018

DISCLOSURE OF THE INVENTION

Problem to be Solved by the Invention

In the contact-type measuring method, only the positions can be measured to which a bar-gauge can be sticked by an operator, so that the locations where this type of method is applicable are significantly restricted. On the contrary, the noncontact-type measuring method utilizing a laser rangefinder has a higher flexibility in terms of measuring positions. However, in the conventional methods, the reflective part of the target needs to be located obliquely inclined with respect to the displacement measuring direction of the civil structure, and the laser rangefinder needs to be located in the direction normal to the reflective part. Thus, it may be restricted in locating the laser rangefinder or the like for measuring the civil structure having specific structure or measuring the displacement in some direction. For example, in a case of measuring the deflection of a bridge in the vertical direction, a target needs to be located at the lower or the side surface of a floor slab or a bridge girder which constitute a superstructure work, and a laser rangefinder needs to be located obliquely below the target. However, when the bridge is bridged over the water, or when some obstacles exist under the bridge, the laser rangefinder is unable to be located obliquely below the target. These restrictions may exist not only in measuring the deflection of a bridge but also in measuring various civil structures.

Furthermore, in some cases, a GPS or an aerial photograph are used to measure the displacement of a natural object, such as a mountain. Although these techniques are suitable for measuring a relatively slow displacement; they have difficulty in dynamically measuring a rapid displacement such as a landslide or a snowslide, and unable to response promptly. In a case of measuring the fast displacement such as a landslide or a snowslide utilizing a laser rangefinder, it may also be restricted in locating the laser rangefinder similarly to the above-mentioned displacement measurement of the civil structure.

Accordingly, the object of the present invention is to provide a displacement measuring method and an instrument having a high flexibility in locating a target and a laser rangefinder, and to provide a target or the like suitable therefor.

Means for Solving the Problem

The displacement measuring method of the present invention address the above problem by locating a target having a reflective part for a laser beam at a measuring object position of a measuring object such that the reflective part is obliquely inclined with respect to a displacement measuring direction; locating a laser rangefinder at a position which is relatively displaced in the displacement measuring direction with respect to the measuring object position; making a laser beam projected from the laser rangefinder to impinge obliquely on the reflective part along a different direction than the displacement measuring direction; with the laser rangefinder, receiving the reflected light returned from the reflective part in the direction generally parallel with the incident direction of the laser beam; measuring variation in the distance from the laser rangefinder to the laser beam reflecting position reflective part; and measuring the displacement of the displacement measuring object position in the displacement measuring direction by utilizing correlation between the detected variation and the displacement of the measuring object position in the displacement measuring direction.

In the measuring method of the present invention, the displacement of the measuring object in the displacement measuring direction is obtained by alternatively measuring the variation in the distance from the laser rangefinder to the laser beam reflection position in accordance with the tilt of the reflective part of the target. The displacement of the target measuring object can be then obtained by utilizing the correlation between the variation in the distance and the displacement in the measuring direction. Furthermore, since the laser beam is made to impinge obliquely on the reflective part of the target and the reflected light returned from the reflective part in the direction generally parallel with the incident direction is received with the laser rangefinder, less restrictions are applied for the orientation of the target or the location of the laser rangefinder than in the conventional method, and the versatility of the distance measuring method with the laser rangefinder can be extended.

In an embodiment of the displacement measuring method of the present invention, plural small reflective faces which are generally orthogonal to the incident direction of the laser beam may be formed to the reflective part with their positions shifted successively in the incident direction. With such small reflective faces formed, the reflective part is obliquely tilted with respect to the displacement measuring direction, as well as the laser beam impinged on the respective small reflective face is effectively reflected in the direction generally parallel with the incident direction, thereby to improve the limit or the resolution of the displacement measurement with a laser rangefinder can be improved.

When the above-mentioned small reflective faces are formed, a relation between the beam diameter of the laser beam and the dimensions of the respective small reflective faces may be set such that the laser beam impinges on the plural small reflective faces of the reflective part at a same time, and the reflected beams from the respective small reflective faces may be received with the laser rangefinder. The laser beam is made to impinge on the plural small reflective faces at a same time in this manner, and the differences in the illuminated area on the respective small reflective face are reflected to the intensity of the reflected lights from the respective small reflective faces. By utilizing the intensities, the variation in the distance in the incident direction of the laser beam can be measured in a smaller resolution than the shift amount between the adjoining reflective faces in the incident direction, that is, with a high precision.

Furthermore, a reflective layer may be formed to the small reflective face, which enhances a reflection coefficient of the laser beam in the incident direction. With such a reflective layer formed, the reflected light can be made effectively to enter the laser rangefinder.

In an embodiment of the displacement measuring method of the present invention, plural small reflective parts may be formed to the reflective part with their positions shifted successively in the incident direction, and a reflective mechanism may be formed to each of the plural small reflective parts, which can return a beam in the direction parallel with the incident direction of the beam regardless of the variation in the incident direction of the beam. With such a reflective mechanism formed, the reflected light having enough intensity can be entered to the laser rangefinder, even if the incident direction of laser beam is deviated. In this embodiment, the reflective part may further have small reflective faces which connects the two adjoining small reflective parts of the plural small reflective parts and extends along the incident direction. In this case, even if the incident direction of the laser beam is deviated within the range of impinging on the small reflective faces, the incident beam is reflected from the small reflective faces to enter the reflective mechanism, and the light projected from the reflective mechanism is reflected again from the small reflective face and returned in the direction parallel with the incident direction. Accordingly, since the target has a large acceptable incident angle of the laser beam, the precision required for positioning the target is reduced. Furthermore, a reflective layer may be formed to each of the small reflective faces, which enhances a reflection coefficient of a laser beam.

In an embodiment of the displacement measuring method of the present invention, the laser rangefinder can project a reference laser beam which differs from the laser beam. A reference target having a reflective part for the reference laser beam is located at the predetermined stationary position different from the above-mentioned displacement measuring position. The reference laser beam projected from the laser rangefinder is made to impinge on the reference target. The reflected light is received with the laser rangefinder which is reflected from the reflective part of the reference target in the direction generally parallel with the incident direction of the reference laser beam. Thus, the distance from the laser rangefinder to the laser beam reflecting position on the reflective part of the reference target is measured. The displacement at the displacement measuring position in the displacement measuring direction may be measured by taking account of the measurement result. In this configuration, the errors due to the movement of the laser rangefinder itself in the measuring can be corrected since the distance from the reflecting position on the reference target located at the predetermined stationary position to the laser rangefinder is measured, and the displacement of the measuring object in the displacement measuring direction is measured by taking account of the measurement result.

In this embodiment, the reflective part of the reference target and the reflective part of the target have a same structure. The reference target may be located at the stationary position such that the orientation of the reflective part of the reference target with respect to the reference incident direction of the laser beam is opposite to the orientation of the reflective part of the target with respect to the incident direction of the laser beam. In this configuration, the influence on the displacements of the laser rangefinder in at least tow directions of the displacement measuring direction and the incident direction of the laser beam is cancelled by adding the displacement of the laser rangefinder obtained by the laser rangefinder in projecting the reference laser beam to the reference target and the displacement in the displacement measuring direction obtained by the laser rangefinder in projecting the laser beam to the target.

In an embodiment of the displacement measuring method of the present invention, the measuring object may be a civil structure. The civil structure may have plural leg part and a superstructure work bridged between the leg parts. In this case, the target is located at the superstructure work, the laser rangefinder is located at the leg part, and the displacement measuring direction may be set orthogonal to the longitudinal direction of the superstructure work. Furthermore, the civil structure may be a bridge having plural bridge piers or bridge abutments and a superstructure work bridged between the bridge piers or the bridge abutments. In this case, the target may be located at the superstructure work such that the reflective part is obliquely inclined to both of the longitudinal and vertical directions of the superstructure work. The laser rangefinder may be located at the bridge pier or bridge abutment such that the laser beam illuminates the target along the longitudinal direction of the superstructure work. In this configuration, the deflection of the superstructure work in the vertical direction or the displacement in the direction of horizontally traversing the superstructure work can be measured. By projecting the laser beam along the superstructure work, the laser rangefinder does not need to be located obliquely below the superstructure work, and the deflection or the like of the superstructure work bridged over a water surface, a building or other obstacles can be measured easily.

In an embodiment of the displacement measuring method of the present invention, plural targets with their reflective parts directing in different directions from each other are located at the displacement measuring positions of the civil structure, and the displacements in the plural displacement measurement directions may be measured at a same time by projecting the laser beams to the reflective parts of the respective plural targets along a same direction from the plural laser rangefinders corresponding to the plural targets. When the displacements in the plural directions are measured at a same time in this manner, the displacements of the civil structure can be measured more precisely. Furthermore, in the conventional method, the laser rangefinders need to be located for the respective reflective parts of the targets in the direction normal to the reflective parts, so that the positions of locating the laser rangefinders corresponding to the plural targets are greatly apart from each other. On the contrary, there exist no such requirements exist in the present invention, so that the laser rangefinders can be located in the neighbor of the respective targets and laser beams can be projected from the respective laser rangefinders in a same direction. Accordingly, the locating positions of the laser rangefinders can be easily obtained, cabling works for the respective laser rangefinders can be easily put together, and the laser rangefinders can be easily maintained.

Furthermore, in an embodiment of the displacement measuring method of the present invention, an auxiliary target having a reflective part orthogonal to the incident direction of the laser beam is located at the displacement measuring position, and at the same time of the displacement measurement in the displacement measurement direction, the displacement at the displacement measuring position in the incident direction may be measured by projecting a laser beam to the reflective part of the auxiliary target along the same direction to the incident direction for the target. In this case, the displacement in the displacement measuring direction can e measured more precisely by subtracting the displacement in the incident direction measured with the auxiliary target from the displacement measured by alternatively measuring the variation in the distance in the incident direction in stead of the displacement in the displacement measuring direction.

The displacement measuring instrument of the present invention address the above problem by including a target having a reflective part for a laser beam, the reflective part being positioned at a measuring object position of a measuring object such that the reflective part is obliquely inclined with respect to a displacement measuring direction; and a laser rangefinder which is located at a position relatively displaced in the displacement measuring direction with respective to the measuring object position, makes a laser beam to impinge on the reflective part along a direction differing than the displacement measuring direction and obliquely inclined with respect to the reflective part, receives the reflected light returned from the reflective part in the direction generally parallel with the impinging direction of the laser beam, and outputs a signal corresponding to a distance to the laser beam reflecting position or the variation in the distance.

According to the displacement measuring instrument of the present invention, the laser beam projected from the laser rangefinder is made to impinge obliquely on the reflective part of the target, and the reflected light returned in the direction generally parallel with the incident direction is received with the laser rangefinder. The displacement at the displacement measuring position where the target is located in the incident direction of the laser beam can be obtained by alternatively measuring the variation in the distance from the laser rangefinder to the laser beam reflecting position with the laser rangefinder. Accordingly, by converting the variation in the distance measured with the laser beam to the displacement of the measuring object utilizing the correlation between the variation and the variation in the displacement at the displacement measuring position in the displacement measuring direction, the displacement of the measuring object can be measured in accordance with the displacement measuring method of the present invention.

In an embodiment of the displacement measuring instrument of the present invention, plural small reflective faces which are generally orthogonal to the incident direction of the laser beam may be formed to the reflective part with their positions shifted successively in the incident direction. Furthermore, a relation between the beam diameter of the laser beam and the dimensions of the respective small reflective faces may be set such that the laser beam impinges on the plural small reflective faces of the reflective part at a same time, and the reflected beams from the respective small reflective faces may be received with the laser rangefinder. A reflective layer may be formed to each of the small reflective faces, which enhances a reflection coefficient of a laser beam in the incident direction. Furthermore, in an embodiment of the displacement measuring instrument of the present invention, plural small reflective parts may be formed to the reflective part with their positions shifted successively in the incident direction, and a reflective mechanism may be formed to each of the plural small reflective parts, which can return a beam in the direction parallel with the incident direction of the beam regardless of the variation in the incident direction of the beam. In this case, the reflective part may have small reflective faces which connects the two adjoining small reflective parts of the plural small reflective parts and extends along the incident direction, and furthermore, a reflective layer may be formed to each of the small reflective faces, which enhances a reflection coefficient of a laser beam in the incident direction. Furthermore, in an embodiment of the displacement measuring instrument of the present invention, the laser rangefinder is configured to able to project a reference laser beam which differs from the above-mentioned laser beam, and further includes a reference target which is located at the predetermined stationary position differed from the above-mentioned displacement measuring position and has a reflective part for the reference laser beam. The laser rangefinder may have means that makes to impinge the reference laser beam on the reflective part of the reference target, receives the reflected light returned from the reflective part of the reference target in the direction generally parallel with the incident direction of the reference laser beam, and outputs signals corresponding to the distance or the variation in the distance to the reference laser beam reflecting position. The reflective part of the reference target and the reflective part of the target have a same structure from each other, and the reference target may be located at the stationary position Q such that the orientation of the reflective part of the reference target with respect to the incident direction of the reference laser beam is opposite to the orientation of the reflective part of the target with respect to the incident direction of the laser beam. Furthermore, in an embodiment of the displacement measuring instrument of the present invention, the measuring object may be a civil structure. The civil structure includes plural leg parts and a superstructure work bridged between the leg parts, the target is located at the superstructure work, and the laser rangefinder is located at the leg part, and the displacement measuring direction may be set to the direction orthogonal to the longitudinal direction of the superstructure work. Alternatively, the civil structure is a bridge having plural bridge piers or plural bridge abutments and a superstructure work bridged between the bridge piers or the bridge abutments, and the target may be located at the superstructure work such that the reflective part is obliquely inclined to both of the longitudinal the vertical directions of the superstructure work, and the laser rangefinder may be located at the bridge pier or the bridge abutment such that the laser beam illuminate the target along the longitudinal direction of the superstructure work.

The advantages of these aspects are same as described with regard to the above-mentioned measuring method.

In an embodiment of the displacement measuring instrument of the present invention, the target may be mounted to the civil structure with magnetic force. In case of utilizing magnetic force, the use has an advantage that the target can be easily mounted to the civil structure constructed from magnetic material, such as a steel bridge girder.

In an embodiment of the displacement measuring instrument of the present invention, the instrument may further have displacement calculating means the calculates the displacement at the displacement measuring position in the displacement measuring direction by utilizing the correlation between the variation in the output signal of the laser rangefinder and the displacement at the displacement measuring position in the displacement measuring direction. With such displacement calculating means, the instrument can perform the displacement measuring method of the present invention. However, in the displacement measuring instrument of the present invention, the laser rangefinder may output only the distance or the variation in the distance in the incident direction of the laser beam, and the conversion to the displacement of the civil structure in the displacement measuring direction can be performed in another processing apparatus using a personal computer etc.

In an embodiment of the displacement measuring instrument of the present invention, plural of the laser rangefinders may be located such that the plural targets with their reflective parts directing in different directions from each other are located at the displacement measuring positions of the civil structure, and the laser beam illuminate the reflective part of each of the plural targets along a same direction. Alternatively, an auxiliary target having a reflective part orthogonal to the incident direction of the laser beam is located at the displacement measuring position, and another laser rangefinder may be located which projects a laser beam to the auxiliary target along the same direction to the incident direction to the above-mentioned target. With these configurations, the displacement at the displacement measuring position can be measured more precisely by measuring the displacement of civil structure in the plural directions at a same time with the plural laser rangefinders, as explained in the aspect of the above-mentioned displacement measuring method.

The displacement measuring target of the present invention has a reflective part for a laser beam, and plural small reflective faces, which are obliquely intersected with the direction connecting one end to the other end of the reflective part and are parallel with each other, are formed to the reflective part from one end to the other end 12b of the reflective part 12 with the parts sifted successively, a reflective layer is formed to each of the small reflective faces, which enhances a reflection coefficient of a laser beam. With this target, when the laser beam is made to impinge near normal to the small reflective faces, the laser beam can be effectively reflected in the incident direction. Accordingly, the limit or the resolution of the measurement can be improved in performing the displacement measuring method of the present invention.

The another displacement measuring target of the present invention has a reflective part for a laser beam, and plural small reflective faces, which are obliquely intersected with the direction connecting one end to the other end of the reflective part and are parallel with each other, are formed to the reflective part from one end to the other end 12b of the reflective part 12 with the parts sifted successively, and a magnet is attached at a mount to a civil structure. With this target, the target can be easily mounted to the civil structure, which is constructed of a magnetic material such as steel.

The civil structure of the present invention has a target having a reflective part for a laser beam, and plural small reflective faces, which are obliquely intersected with the direction connecting one end to the other end of the reflective part and are parallel with each other, are formed to the reflective part from one end to the other end 12b of the reflective part 12 with the parts sifted successively. With such a structure, the displacement measuring method of the present invention can be performed by making the laser beam to impinge near normal to the small reflective faces.

Effect of the Invention

As described above, according to the present invention, the displacement of the measuring object in the displacement measuring direction is obtained by alternatively measuring the variation in the distance from the laser rangefinder to the laser beam reflection position in accordance with the tilt of the reflective part of the target. The displacement of the target measuring object can be then obtained by utilizing the correlation between the variation in the distance and the displacement in the measuring direction. Furthermore, since the laser beam is made to impinge obliquely on the reflective part of the target and the reflected light returned from the reflective part in the direction generally parallel with the incident direction is received with the laser rangefinder, less restrictions are applied for the orientation of the target or the location of the laser rangefinder than in the conventional method, and the versatility of the distance measuring method with the laser rangefinder can be extended.

BEST MODE FOR CARRYING OUT THE INVENTION

Figure 1:
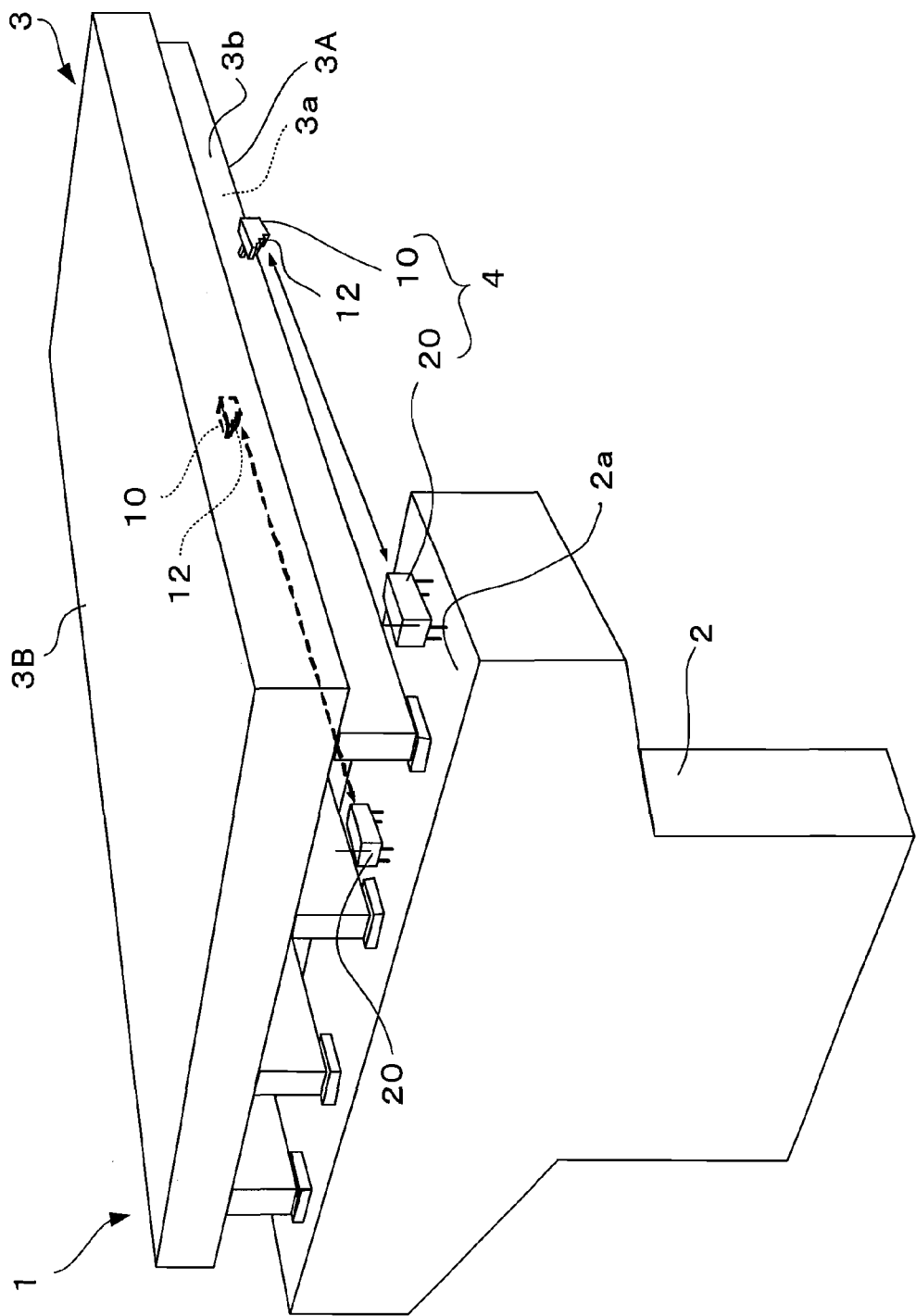
FIG. 1 illustrates locating conditions of targets and laser rangefinders in a perspective view, when the deflection of a bridge is measured in accordance with the present invention.
Figure 2:
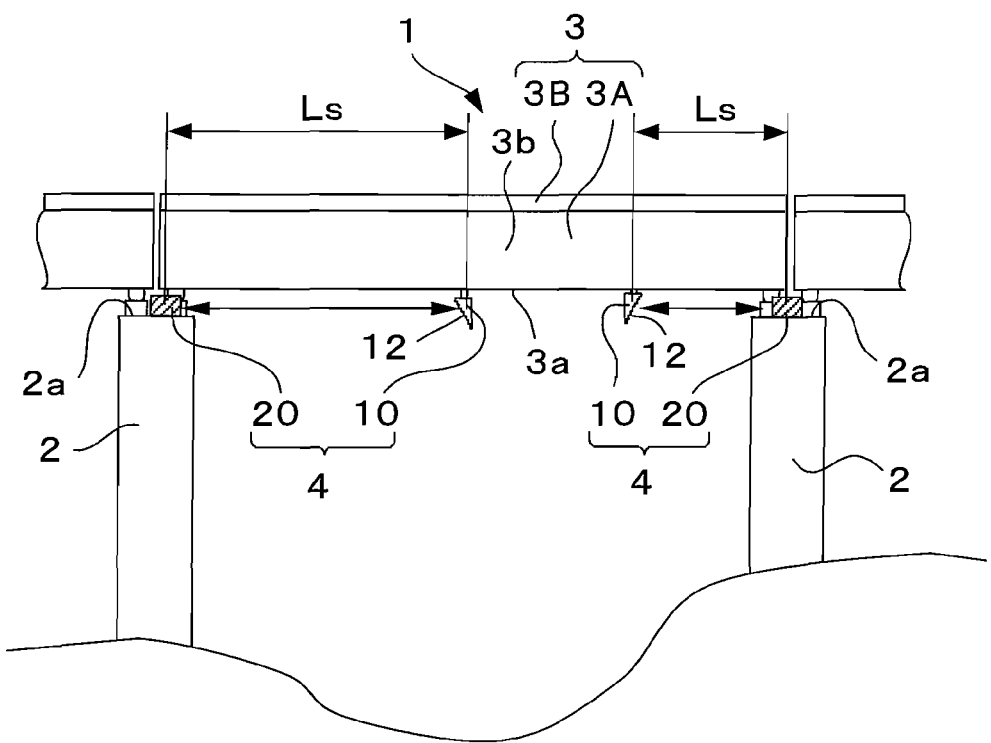
FIG. 2 illustrates locating conditions of targets and laser rangefinders in a side view.

FIGS. 1 and 2 illustrate an application of a displacement measuring method of the present invention for measuring the deflection of a bridge in the vertical direction. The bridge 1 is constructed as a civil structure to have a superstructure work 3 bridged over between plural bridge piers 2. The superstructure work 3 is supported by bridge abutments at both ends of the bridge 1. The bridge piers 2 are supported by foundations (not shown) which are piled into the ground. The bridge piers 2, bridge abutments and foundations form a substructure work. The superstructure work 3 includes plural bridge girders 3A, both ends of which are supported by the bridge piers 2; and a floor slab 3B positioned over the bridge girders 3A. However, the construction is an example of the superstructure work 3, and can be modified suitably.

A target 10 for a displacement measuring instrument 4 is located on at least one of the displacement measuring positions of a lower surface 3a or a side surface 3b of the bridge girder 3A, whereas a laser rangefinder 20 for the displacement measuring instrument 4 is located at the upper end surface 2a of a bridge pier 2. The laser rangefinder 20 may be located at a bridge abutment, in place of or further on a bridge pier 2. In the following, it is assumed that the laser rangefinder 20 is located at a bridge pier 2. However, the locating position and the number of targets 10 may be suitably modified, when necessary. In stead of or in addition to the bridge girder 3A, the target 10 may be mounted on the floor slab 3B. In the following, it is assumed that the target 10 is mounted to the bridge girder 3A. However, unless otherwise noted, the description is also applicable to a case in which the target 10 is mounted to the floor slab 3B.

The laser rangefinder 20 may be located on the position which is displaced in the vertical direction relative to the displacement measuring position of the superstructure work 3, and may be located on the ground plane where the bridge 1 is bridged. Namely, the place displaced relative to the displacement measuring position may be a place from which the displacement in the displacement measuring direction at the displacement measuring position is observable, and includes both a place oscillating with a different phase or amplitude in the displacement measuring direction relative to the displacement measuring position and a place like a ground plane which is substantially not displaced in the displacement measuring direction. For example, the deflection or the like at the middle part of the bridge girder 3A relative to the supporting end may be measured, when the target is located at the middle position of the bridge girder 3A, and the laser rangefinder 20 is located at the supporting end of the bridge girder 3A.

Figure 3:
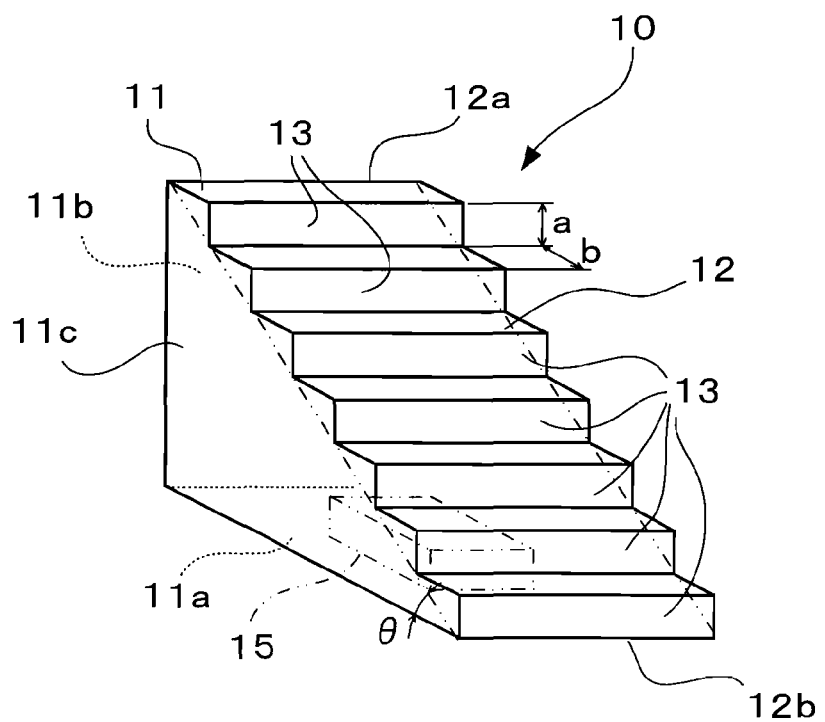
FIG. 3 is a perspective view of the target.

As shown in FIG. 3, the target 10 includes a target main body 11 in a shape of a near triangle column. The slope (shown in the figure with the imaginary line) of the target main body 11 is configured to serve as a reflective part 12. The reflective part 12 is formed generally in a shape of a staircase with plural small reflective faces 13 from one end 12a to the other end 12b of the reflective part 12 with their positions shifted successively in a specific direction (the direction normal to the end surface 11b, in this case). The bottom surface 11a, the end surface 11b, and the side surface 11c of the target main body 11 are formed from the planes which are orthogonal to each other. The small reflective faces 13 are parallel with each other. Furthermore, the directions normal to the respective small reflective faces 13 are parallel with the bottom surface 11a. The heights a of the small reflective faces 13 in the direction parallel with the end surface 11b are same to each other. Furthermore, the shift amounts b of the small reflective faces 13 in the direction parallel with the bottom surface 11a are also same to each other. The number, the height a, and the shift amount b of the small reflective faces 13 may be determined suitably, according to various measuring conditions, such as the dimension of the displacement to be measured, the resolution of the displacement measurement, the specification of the laser rangefinder 20, and the distance Ls between the target 10 and the laser rangefinder 20. The relation with the laser rangefinder 20 will be described later.

Material of the target 10 can be selected suitably. For example, metal material, plastic material, wood, etc. can be used as the material of the target 10. As for mounting the target 10 to the bridge girder 3A, various securing means may be used including mechanical connecting means such as a vise and bolt and nuts, adhesives, or the like. When the target mounting part of the bridge girder 3A is made of steel, a magnet 15 is fixed to the bottom surface 11a or the like of the target main body 11 as shown with an imaginary line in FIG. 3, and the target 10 can be mounted to the bridge girder 3A with the magnetic force. The use of the magnet 15 has an advantage of able to fix the target 10 without removing the paint coated on the bridge girder 3A. The target 10 can be easily replaced, and the mounting position, the configuration and the orientation of the target 10 can be easily modified. The whole target main body 11 may be formed from a magnet. Furthermore, the magnet 15 may be a permanent magnet or an electromagnet. When a power supply for the target 10 is not available, a permanent magnet can be used. When mounting with the magnet, the drop-off or the displacement of the target 10 is more reliably prevented by securing the target 10 with other securing means. When the target 10 is located at an outdoor structure or the like, the target 10 has preferably a weather resistance. When the target 10 is produced from the material having a good weather resistance, a good heat resistance, or a good cold resistant (for example, a heat resistance plastic material), the applicability of the present invention is extended. When the target 10 is made of plastics, the target 10 can be produced at a low cost due to the various applicable forming methods.

Figure 4:
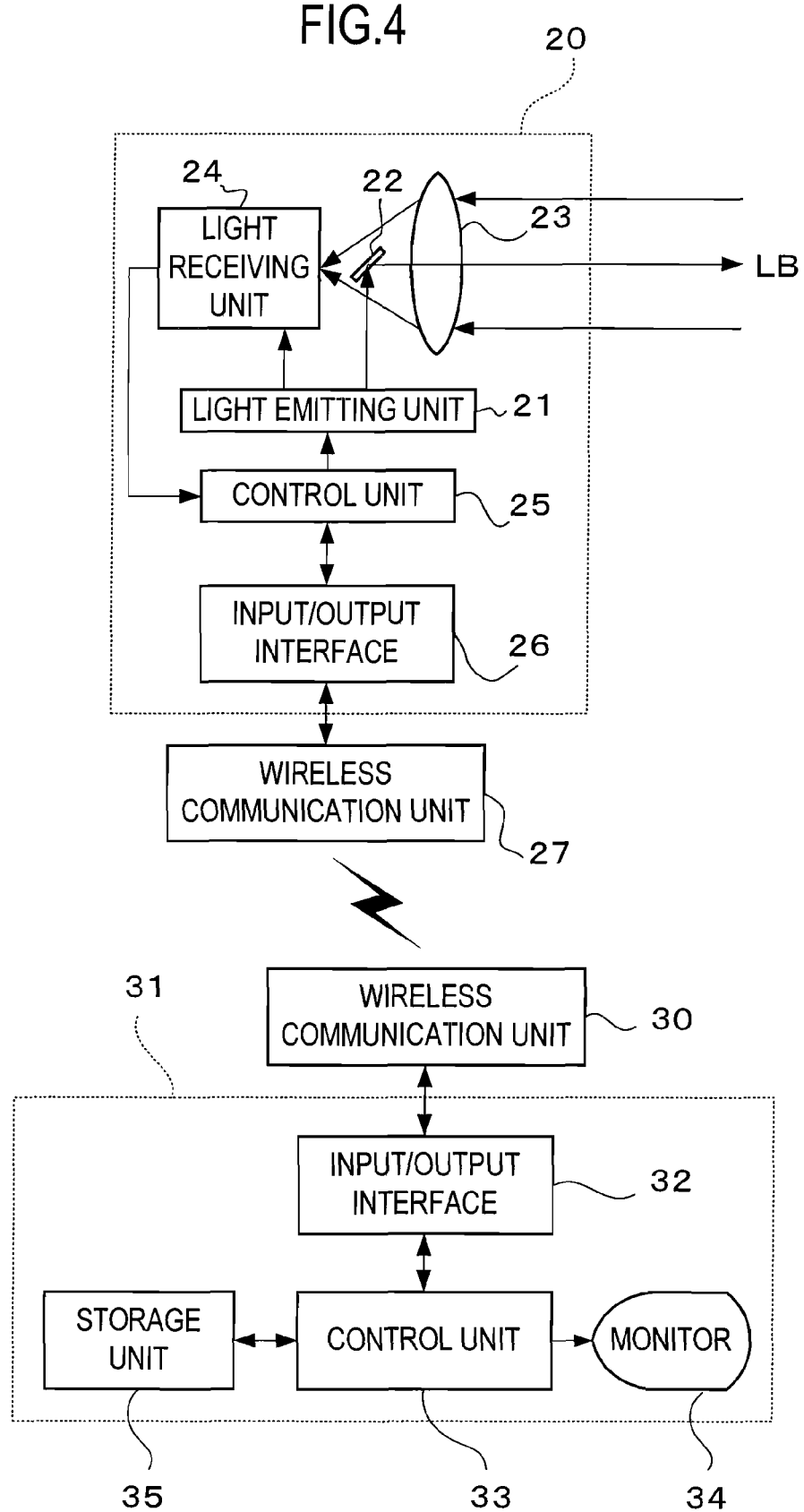
FIG. 4 illustrates a configuration of a main part of the laser rangefinder.

FIG. 4 illustrates a main part of the laser rangefinder 20. The laser rangefinder 20 is a so-called phase difference detection type, and includes a light emitting unit 21 that projects a laser beam, a mirror 22 which deflects the laser beam LB projected from the light emitting unit 21 to the target 10 (not shown in FIG. 4), a lens 23 that converges the reflected light returned from the target 10 in the direction parallel with the incident direction of the laser beam, a light receiving unit 24 that receives the reflected light converged by the lens 23 and the reference laser beam projected by the light emitting unit 21, and a control unit 25 that computes the output signal of the light receiving unit 24. The light emitting unit 21 includes a semiconductor laser as a light source, and projects a pulse of a period T (for example, 500 Hz) of a laser beam LB to the mirror 22 and the light receiving unit 24 at the same time in response to the emitting instruction of the control unit 25.

Figure 5A:
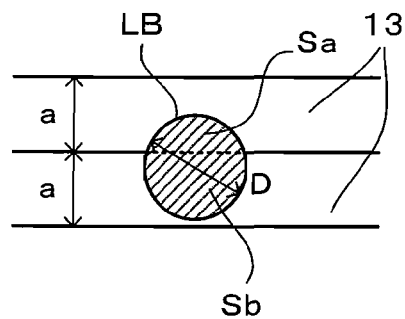
FIG. 5A is a front view of the reflective part of the target, and illustrates a relation between the diameter of the laser beam impinging on the target and the reflective part of the target.
Figure 5B:
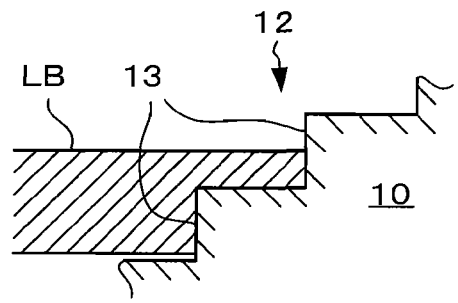
FIG. 5B is a cross-sectional view of the target, and illustrates a relation between the diameter of the laser beam impinging on the target and the reflective part of the target.

Although the laser beam projected from the light emitting unit 21 is converged into a beam-shape, the laser beam has actually a minute beam divergence angle. Thus, when a relatively large structure such as the bridge 1 is measured, the projected area on the target 10 is broadened non-negligibly. The height a of the small reflective faces 13 of the target 10 is determined by taking account of the projected area of the laser beam. Namely, as shown in FIGS. 5A and 5B, when the beam diameter of the laser beam LB projecting the target 10 is D, the height a of the small reflective faces 13 is set to be equal to or less than the beam diameter D, so that at least two small reflective faces 13 are projected by the laser beam at the same time. The shift amount b can be set equal to or smaller than Vc/T(mm), when the period of the laser beam projected from the laser rangefinder 20 is T(s), and the velocity of the laser beam in the atmosphere is Vc(mm/s). The height a may be limited less than the shift amount b. The height a and shift amount b may be adjusted suitably according to the beam characteristics of the laser rangefinder 20 to be used, such as a divergence angle of the beam, a frequency, or the like.

Figure 6:
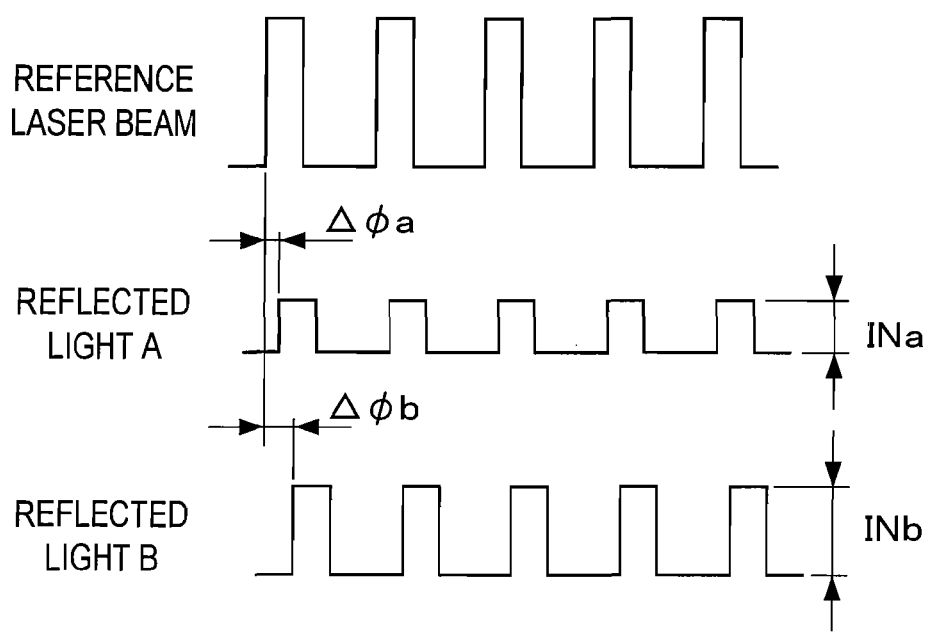
FIG. 6 illustrates trains of pulses, each corresponding to a reference laser beam and a reflected light received by the rangefinder.

The light receiving unit 24 converts the reference laser beam projected from the light emitting unit 21 and the reflected light reflected from the target 10, and outputs electric signals, respectively. In the control unit 25, trains of pulses corresponding to the reference laser beam and the reflected light are extracted from the digital signals which are A/D converted from the output signals of the light receiving unit 24, and the distance Ls from the laser rangefinder 20 to the target 10 is measured by utilizing the phase difference of the trains of pulses. As described above, since the reflected light includes the reflected light from the plural small reflective faces 13, and since the distances from the target 10 to the respective small reflective faces 13 differ from each other, the signal corresponding to the reflected light includes plural trains of pulses corresponding to the number of the small reflective faces 13 which are illuminated by the laser beam. For example, when a laser beam illuminates two small reflective faces 13 at a same time as shown in FIGS. 5A and 5B, as shown in FIG. 6, the output signal for the reflected light includes trains of pulses signal having a phase difference $\Delta\phi a$ and trains of pulses signal having a phase difference $\Delta\phi b$ to the trains of pulses corresponding to the reference laser beam. In the control unit 25, the phase differences of these pulse signals are multiplied by the weighting factors corresponding to the respective signal intensities INa, INb and averaged, so that the phase difference of the trains of pulses corresponding to the reflected light is uniquely determined and the distance to the target 10 is calculated. Since the signal intensities INa and INb correspond to illuminated areas Sa and Sb on the small reflective faces 13, respectively, with the above process, even if the reflective part 12 of the target 10 is in a shape of a staircase, variation in the distance from the laser rangefinder 20 to the target 10 can be measured continuously. Even if at least three small reflective faces 13 are illuminated at a same time by a laser beam, the phase difference can be uniquely determined by blitzing the weight according to the signal intensity. However, the processing method of determining the distance uniquely based on the reflected lights from the plural small reflective faces 13 is not limited to the above one, various methods are applicable. Although the cross section of the laser beam has a circular shape in FIG. 5A, it is not limited to the circular shape, and the cross section of the laser beam can have other shapes such as eclipse or oval.

Return to FIG. 4, the control unit 25 of the laser rangefinder 20 is connected to the wireless communication unit 27 through the input/output interface 26. Furthermore, a wireless communication unit 30 is also located at a position apart from the laser rangefinder 20, and the wireless communication unit 30 is connected with a data processing instrument 31. The data processing instrument 31 is configured, for example, as a personal computer in which software for controlling the displacement measurement is installed, and performs data processing necessary for measuring the deflection and controls of the laser rangefinder 20. The data processing instrument 31 outputs various instructions required for measurement to the control unit 25 of the laser rangefinder 20 according to measuring software. The control unit 25 controls the light emitting unit 21 to perform measurement of the distance Ls according to the instructions transmitted from the data processing instrument 31. The distance Ls detected by the laser rangefinder 20 is input to the data processing instrument 31 through the wireless communication units 27 and 30. In the data processing instrument 31, the distance data is inputted from the wireless communication unit 30 to the control unit 33 via an input/output interface 32. The communication protocol used between the wireless communication units 27 and 30 is not particularly restrictive, however; is convenient to be able to use staple articles for the data processing instrument 31 or the like, if a communication protocol, for example, in conformity with a wireless LAN is used. The wireless communication unit 30 is not particularly limited in the locating position as long as the unit is located within the area in which the unit and the wireless communication unit 27 can communicate with each other, can be located outdoor or indoor in the neighborhood of the bridge 1. The data processing instrument 31 may be connected with the wireless communication unit 30 via a wired connection or connected with the wireless communication unit 30 via a telephone network or the like. Furthermore, the electric power required to operate the laser rangefinder 20 may be supplied from the outside of the structure with laying out a power supply line, or from the battery built in the laser rangefinder 20. A power generation system using solar power generation or wind power generation may also be provided in the displacement measuring instrument 4.

In order to measure the deflection of the bridge girder 3 in the vertical direction by utilizing the displacement measuring instrument 4 having the above-mentioned configuration, the target 10 is fixed to the displacement measuring position of the bridge girder 3A, such that the reflective part 12 is obliquely inclined with respect to the displacement measuring direction (the vertical direction), more specifically, the small reflective faces 13 is orientated in the near horizontal direction. In this case, the tilt of the reflective part 12 is defined as the direction of the slope shown in FIG. 3, in other words, as the direction connecting the both end portions 12a and 12b of the reflective part 12. Furthermore, the laser rangefinder 20 is located at the upper end surface 2a of the bridge pier 2, such that the laser beam projecting direction is same as the direction normal to the small reflective faces 13 of the target 10. Namely, in this configuration, the incident direction of the laser beam for the target 10 is set to a near horizontal direction. Furthermore, the incident direction of the laser beam for the reflective part 12 of the target 10 and the receiving direction of the laser beam at the laser rangefinder 20 do not need to be strictly same as the direction normal to the small reflective faces 13. When the reflected light received by the laser rangefinder 20 has a practically sufficient intensity, the incident direction or the reflecting direction (receiving direction) may be deviated somewhat from the direction normal to the small reflective faces 13.

Figure 7:
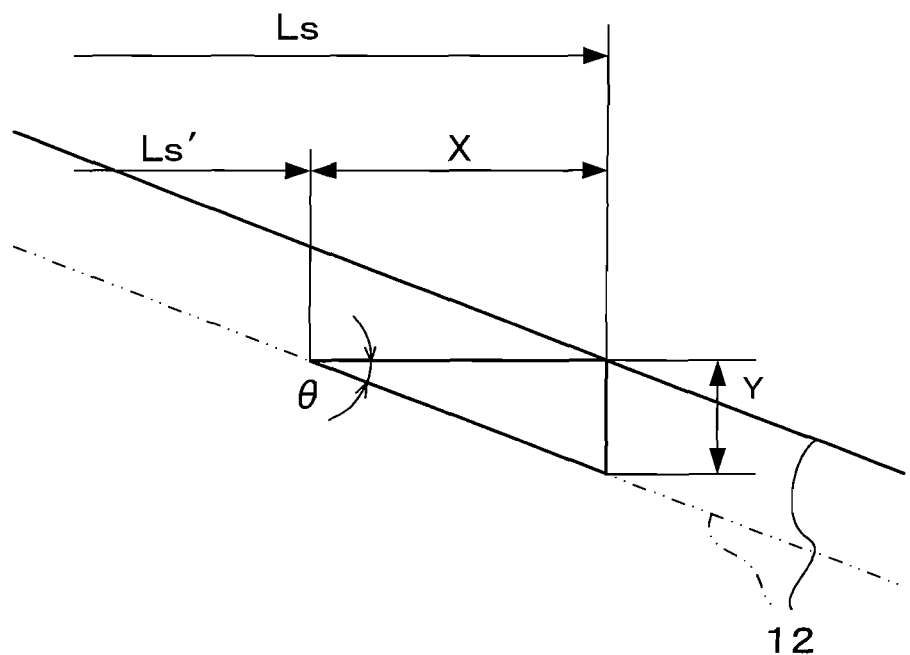
FIG. 7 illustrates a relation between the displacement of the target and the displacement detected by the laser rangefinder.

In the above-mentioned locating configuration, a laser beam is projected from the laser rangefinder 20 to the reflective part 12 of the target 10, and the reflected light returned from the reflective part 12 to the laser rangefinder 20 is received with the laser rangefinder 20, so that the distance Ls from the laser rangefinder 20 to the target 10 (more properly, to the laser beam reflecting position on the target 10) is measured. The distance Ls is input to the control unit 33 of the data processing instrument 31 through the wireless communication units 27 and 30. In the control unit 33 of the data processing instrument 31, based on the variation in the input distance Ls, the deflection of the bridge girder 3A (or the superstructure work 3) is calculated in a manner shown in FIG. 7. Namely, when the bridge girder 3A is deflated by Y relative to the reference condition in the vertical direction, the reflective part 12 of the target 10 is displaced downward by the amount corresponding to the deflection Y, and the distance Ls is changed to Ls' in accordance the displacement of the target 10 in the vertical direction. When the variation in the distance is expressed as X(=Ls−Ls') and the inclination of the reflective part 12 relative to the bottom surface 11a of the target 10 is expressed as θ, a relation expressed in the following equation (1) is established between X and Y.

$$Y = X \tan \theta \quad (1)$$

In the above measurement, the reference condition of the bridge girder 3A may be set suitably in a state including a no-load state, a state in which the bridge 1 is a predetermined load is applied. The distance Ls in the reference condition of the bridge girder 3A can be measured in advance and stored in the data processing instrument 31 as a standard distance. In the data processing instrument 31, the distance measured by the laser rangefinder 20 is subtracted from the reference distance so that the variation X in the distance in the horizontal direction is computed. The deflection Y of the bridge girder 3A is obtained by assigning the computed variation X in the above equation (1). The obtained deflection Y is displayed, for example, on the monitor 34 of the data processing instrument 31, or stored in the storage unit 35, such as the hard disk drive of the data processing instrument 31. Furthermore, when necessary, the measuring result of the deflection Y may be output from the data processing instrument 31 to a printer not shown. Furthermore, in the above measurement, in some measuring conditions, the incident direction of the laser beam may be not same as the direction normal to the small reflective faces 13 of the target 10, in other words, the incident angle of the laser beam can be not normal to the small reflective faces 13. In this case, since the relation between the displacement of the target 10 and the output of the laser rangefinder 20 fails to fit in the relation represented by the above equation (1) completely, the non-negligible errors may be produced. The errors can be corrected in a process of calculating the above-mentioned deflection Y. For example, the output of the laser rangefinder 20 may be corrected by measuring the angular deviation in the incident angle of the laser beam or by finding out a relation between a real displacement of the target 10 and the output of laser rangefinder 20, at a real measuring cite. Furthermore, the correlation realized between the angular deviation in the incident angle of a laser beam and the proportional constant of the displacement of the target 10 to the output of laser rangefinder 20 may be obtained in advance, and a correction value may be set corresponding to the angular deviation obtained at the real measuring cite by utilizing the correlation, then the output of the laser rangefinder 20 may be corrected based on the correction value.

As described above, the measuring method of the present embodiment is a method of measuring the deflection of the bridge girder 3A in the vertical direction with a laser beam projected along the near horizontal direction. The laser rangefinder 20 does not need to be located obliquely below the target 10. Accordingly, even if a water surface or an obstacle such as a building exists under the bridge girder 3A, the laser rangefinder 20 can be located with a high probability, so that fewer restrictions are applied in measuring the deflection in comparison with the conventional method. In particular, since the laser rangefinder 20 is located at the upper end surface 2a of the bridge pier 2, the laser rangefinder 20 rarely goes under the water, and has an advantage able to install and/or maintain the laser rangefinders 20 from above the bridge 1, various electric cablings such as a power cable for the laser rangefinder 20 can be easily laid out.

Figure 8A:
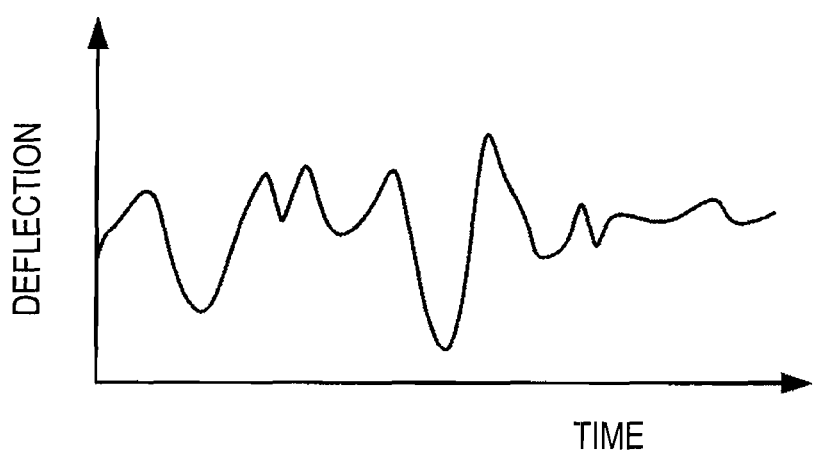
FIG. 8A illustrates an example of a time-variation of the deflection obtained by the laser rangefinder as a result of processing the measuring result of the deflection.
Figure 8B:
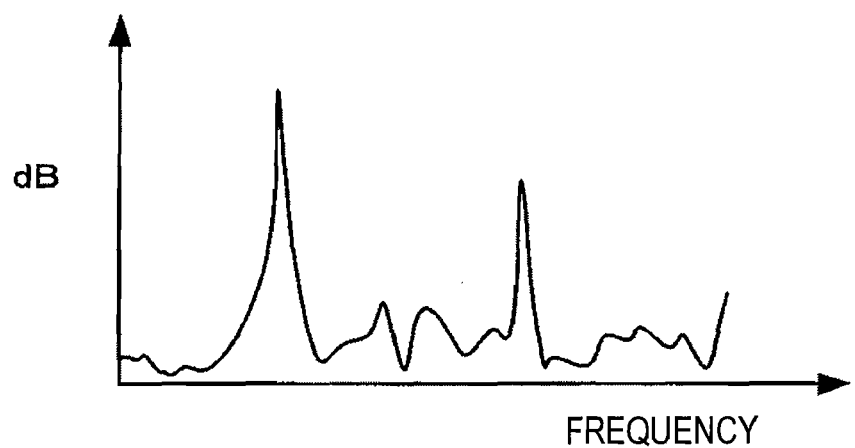
FIG. 8B illustrates an example of a frequency characteristic laser rangefinder determined based on the time-variation of the deflection obtained by the laser rangefinder as a result of processing the measuring result of the deflection.

In the above-mentioned configuration, a pulse of laser beam is projected from the laser rangefinder 20, and the distance Ls is measured by utilizing the phase difference, so that the configuration has an advantage able to measure the deflection in a short time. Accordingly, by repeating the measurements of the deflection in a relatively short cycle, and storing the obtained deflections sequentially in the storage unit 35, the time-variation characteristics of the deflection can be measured as shown in FIG. 8A. Furthermore, the frequency characteristic of the oscillation of the bridge girder 3A as shown in FIG. 8B can also be obtained by analyzing the time-variation characteristics (the oscillating displacement) with FFT. As described above, the displacement measuring instrument of the present embodiment is applicable not only to the detection of a static deflection, but also to the measurement of dynamic characteristics.

Figure 9:
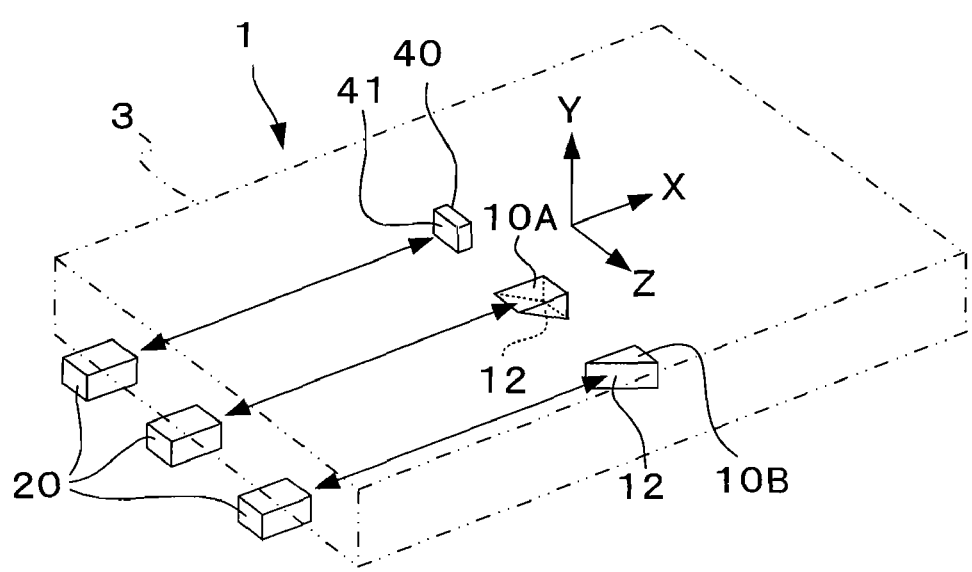
FIG. 9 illustrates a configuration of measuring displacements in plural directions in accordance with the present invention.

The present invention is not limited to the above-mentioned configurations, and can be carried out in various forms. For example, the displacement measuring direction is not limited to the vertical direction. When a triaxial Cartesian coordinate system is defined as shown in FIG. 9 in which the longitudinal direction (the axial direction) of the superstructure work 3 is set as the X-axis, the normal direction thereof is set as the Y-axis, and the direction traversing the superstructure work 3 horizontally is set as the Z-axis, the target 10A for measuring the displacement (the deflection) in the Y-axis direction is located at the superstructure work 3 in a similar manner to FIGS. 1 and 2 as well as the target 10B for measuring the displacement of the superstructure work 3 in the Z-axis direction is located at the superstructure work 3 such that the reflective part 12 is obliquely inclined with respect to both X-axis and Z-axis in the horizontal plane, the laser beam is projected from the laser rangefinder 20 to the reflective parts 12 of the respective targets 10A and 10B along the direction parallel with the X-axis, so that both the deflection and the side displacement of the superstructure work 3 can be measured at a same time. The configurations of the targets 10A and 10B may be substantially same as the configuration of the target 10 shown in FIG. 3.

Furthermore, an auxiliary target 40 having a flat-shape reflective part 41 orthogonal to the X-axis is located at the superstructure work 3, such that the auxiliary target 40 is aligned with the target 10 in the Z-axis direction, and the laser beam is projected from the laser rangefinder 20 to the auxiliary target 40 along the X-axis direction, so that the displacement of the superstructure work 3 in the longitudinal direction can also be measured at a same time. By measuring the displacements in the directions different from the deflection of the superstructure work 3 at a same time in this manner, the state at the displacement measuring position of the superstructure work 3 can be obtained more clearly in comparison with the case of measuring only the deflection in the Y-axis direction. Namely, when the variation in the X-axis direction detected by utilizing the target 10 is identified with d, and the variation in the X-axis direction detected by utilizing the auxiliary target 40 is identified with s (It is noted that the orientation of positive and negative is set to the same one as the variation d.), the inclination of the reflective part 12 of target 10 is identified with θ (see FIG. 7), by assigning X=d−s in the above-mentioned equation (1), the deflection Y in the Y-axis direction can be measured precisely. Furthermore, when the displacement in the X-axis direction as well as the deflection in the Y-axis direction are measured at a same time, by adjusting the displacement in the X-axis direction with respect to the measured value of the deflection in the Y-axis direction, the method has an advantage of able to determine the deflection of the superstructure work 3 more precisely.

Furthermore, in the case of measuring only the displacement in the Z-axis direction, only the target 10B needs to be located at the superstructure work 3. Furthermore, in the configuration of FIG. 9, all of the laser rangefinders 20 can be located at the same upper end surface 2a of the bridge pier 2, so that their locating positions are easily obtained, and cabling works can also be done all at a time, and can be easily maintained. Furthermore, in the configuration of FIG. 9, the targets 10A, 10B, and 40 are located at a same displacement measuring object position along the longitudinal direction (the X-axis direction) of the superstructure work 3, that is, the bridge axis direction measuring position, in other words, are located aligned in line along the traverse direction of the superstructure work 3, so that the errors in the measuring due to the shift of the targets 10A, 10B, and 40 can be suppressed in a minimum level.

Figure 10A:
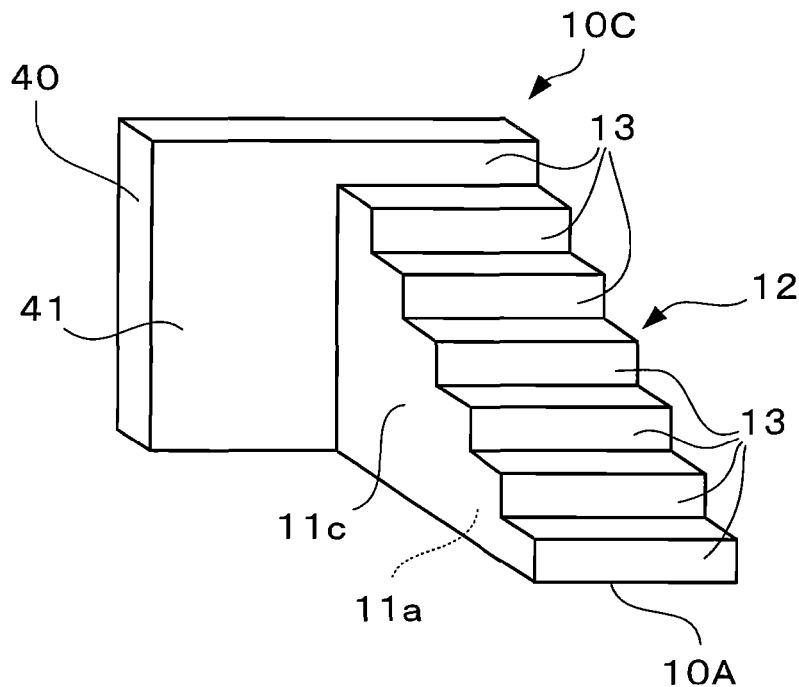
FIG. 10A is a perspective view of a target suitable for the measuring configuration of FIG. 9, in which the deflection of a bridge girder and the displacement of the bridge girder in the longitudinal direction are measured at the same time.
Figure 10B:
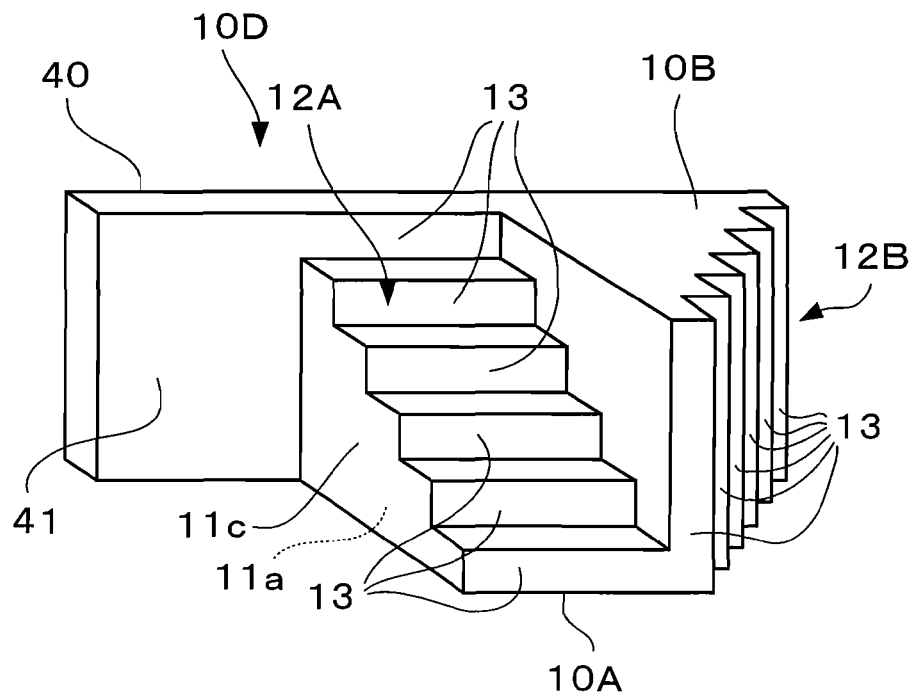
FIG. 10B is a perspective view of a target suitable for the measuring configuration of FIG. 9, in which the deflection of a bridge girder and the displacement of the bridge girder in the longitudinal direction as well as the displacement in the traverse direction of the bridge girder are measured.

FIGS. 10A and 10B illustrate targets suitable for measuring displacements in at least two directions at a same time as shown in FIG. 9, respectively. The target 10C of FIG. 10A is configured by combining the target 10A and the auxiliary target 40 of FIG. 9 in a unit. In this case, the reflective part 41 is formed to a uniformly flat surface parallel with the small reflective faces 13. Furthermore, the target 10D of FIG. 10B is configured by further combining the target 10B of FIG. 9 with the target 10C of FIG. 10A in a unit. Accordingly, in the target 10D of FIG. 10B, the staircase-shape reflective part 12A for measuring the deflection, the reflective part 12B for measuring the side displacement, and the reflective part 41 for measuring the displacement in the longitudinal direction will be combined in a unit. The reflective parts 12A, 12B may have the same structure of the reflective part 12 of FIG. 3.

Figure 11:
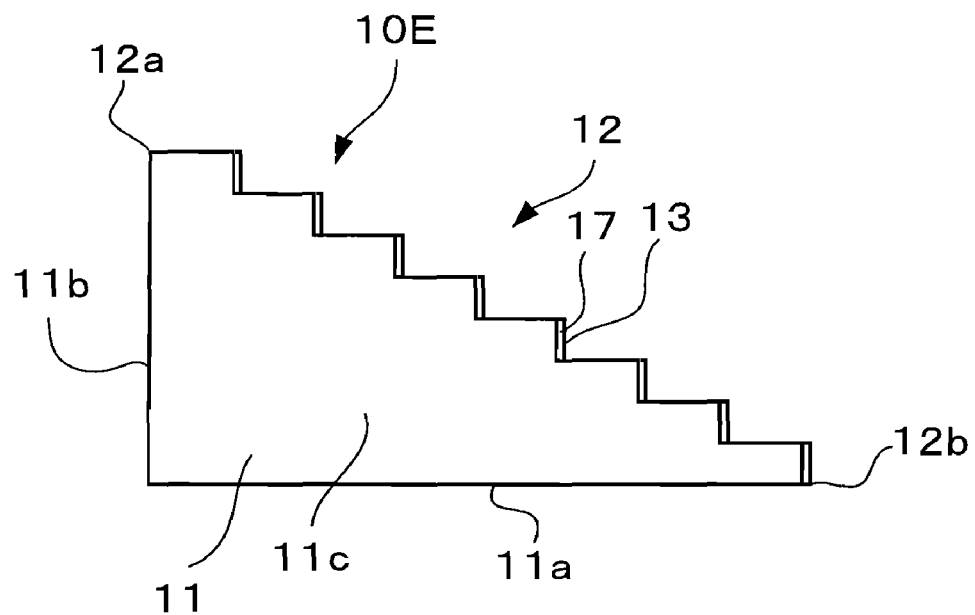
FIG. 11 illustrates a target in which a reflective layer is formed on each of the small reflective faces.

The target 10E of FIG. 11 has a reflective layer 17 for the respective small reflective faces 13, which enhances the reflection efficiency of a laser beam. The reflective layer 17 may be formed, for example, by pasting a reflective tape or coating paint. Furthermore, the reflective layer 17 may be formed by using various coating methods such as plating or spraying.

Figure 12:
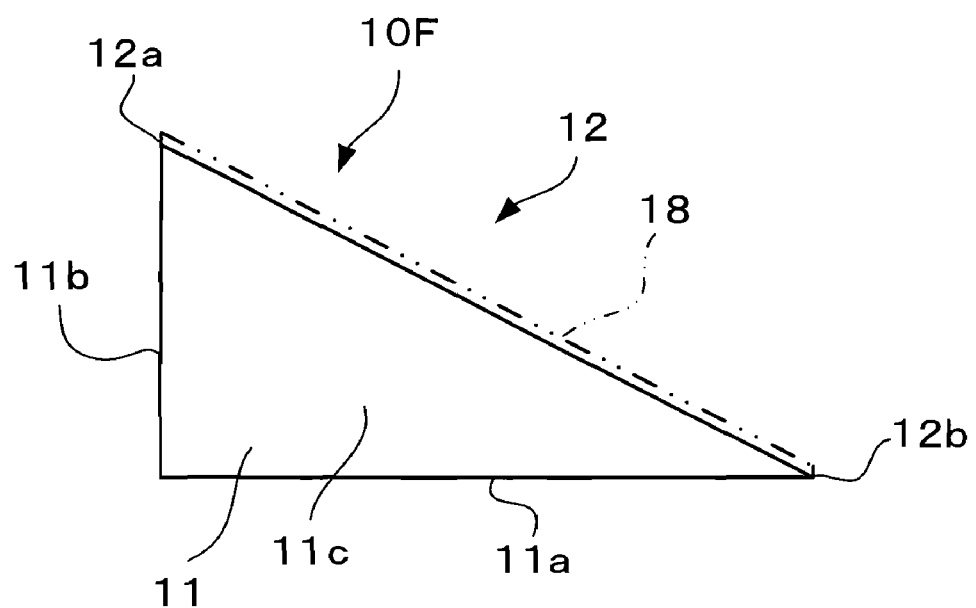
FIG. 12 illustrates a target in which a reflective part is formed on a uniform slope.

The target used in the present invention is not limited to the one having a staircase-shape reflective part. In some state of the diffuse reflection of the laser beam from the reflective part 12, as is the case of the target 10F of FIG. 12, the reflected light having enough intensity required for measuring the displacement is returned in the incident direction of the laser beam even if the reflective part 12 is formed in a shape of uniformly sloped surface connecting the both ends 12a and 12b. In this case, the small reflective faces 13 dare not be formed. Furthermore, as shown with an imaginary line in the FIG. 12, a reflective layer 18 may be further added on the reflective part 12. In this case, it is further preferable if the reflection characteristic of the reflective layer 18 is adjusted to enhance the reflection coefficient in the incident direction so that the reflected light having enough intensity can be detected with the laser rangefinder 20. Such a reflective layer 18 may be realized, for example, by providing numbers of reflective faces which are further refined from the small reflective faces 13 to the reflective layer 18.

Figure 17:
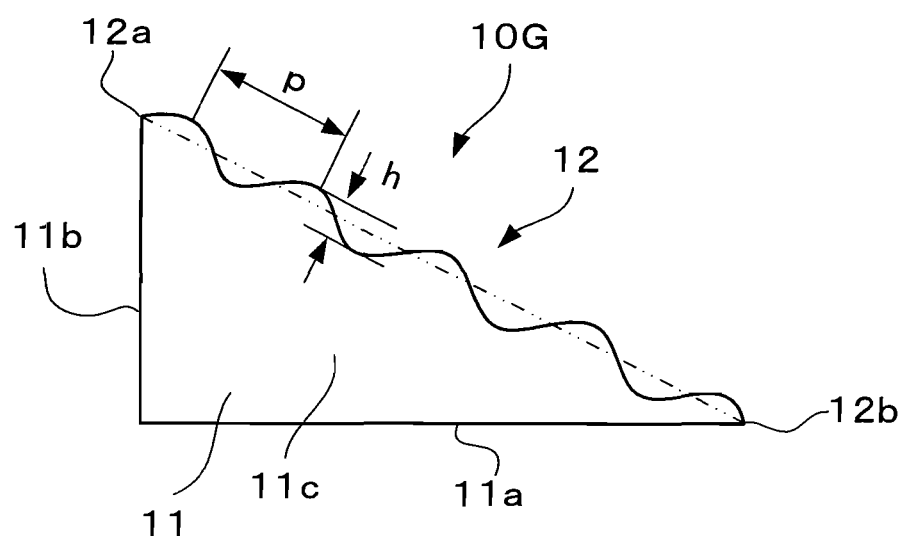
FIG. 17 illustrates a target in which a reflective part is formed in a shape of a wavy surface.

Furthermore, as shown in FIG. 17, the reflective part 12 of the target 10G may be formed in a shape of a wavy curved surface connecting the both ends 12a and 12b. Also in this case, the reflected light having enough intensity required for the displacement measurement is returned in the incident direction of the laser beam, similar to the case of the staircase-shape reflective part formed. The distance (the pitch) p connecting the two adjoining peaks of the wavy form in the target 10G of FIG. 17 and the difference of elevation H between the peak and the trough may be set suitably according to the various measuring conditions described above. Furthermore, the wave form is not limited to a curve such as a sine curve having a rounded corner, may have cusps like a saw blade.

Figure 18:
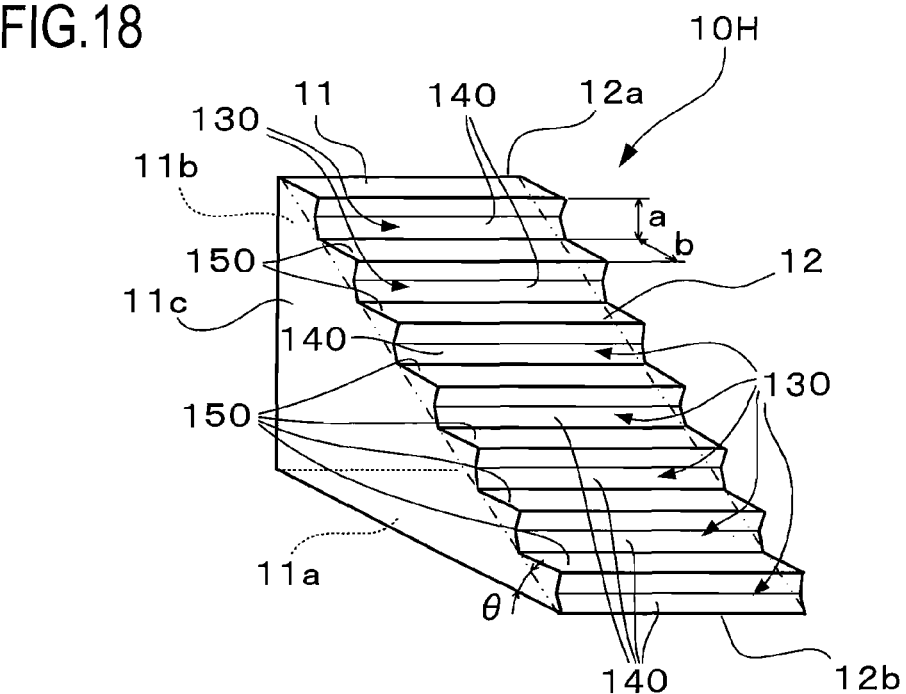
FIG. 18 is a perspective view of a target in which plural small reflective parts are formed to be sifted successively in a direction, and a reflective mechanism configured in a shape of a corner cube is formed to each of the small reflective parts.

Furthermore, as the target 10H shown in FIG. 18, plural small reflective parts 130 may be formed in a specific direction (in this case, in the direction normal to the end surface 11b) from one end to the other end 12b of the reflective part 12 with the parts sifted successively, thereby to form a shape of a staircase as a whole, furthermore, a reflective mechanism 140 configured in a shape of a so-called corner cube may be formed to each of the small reflective parts 130. In this case, the small reflective parts 130 have a same structure, and the heights a of the small reflective parts 130 in the direction parallel with the end surface 11b are same to each other. Furthermore, the shift amounts b of the small reflective parts 130 in the direction parallel with the bottom surface 11a are also same to each other. Furthermore, small reflective faces 150 are formed to the reflective part 12, which connect the two adjoining small reflective parts 130 and extend along the direction parallel with the bottom surface 11a. The number, the height a and the shift amount b of the small reflective parts 130 may be set suitably in accordance with the above mentioned various measuring conditions. As commonly known, the corner cube is a structure having a function of reflecting a beam in the direction parallel with the incident direction of the beam even if the incident direction of the beam varies.

Figure 19:
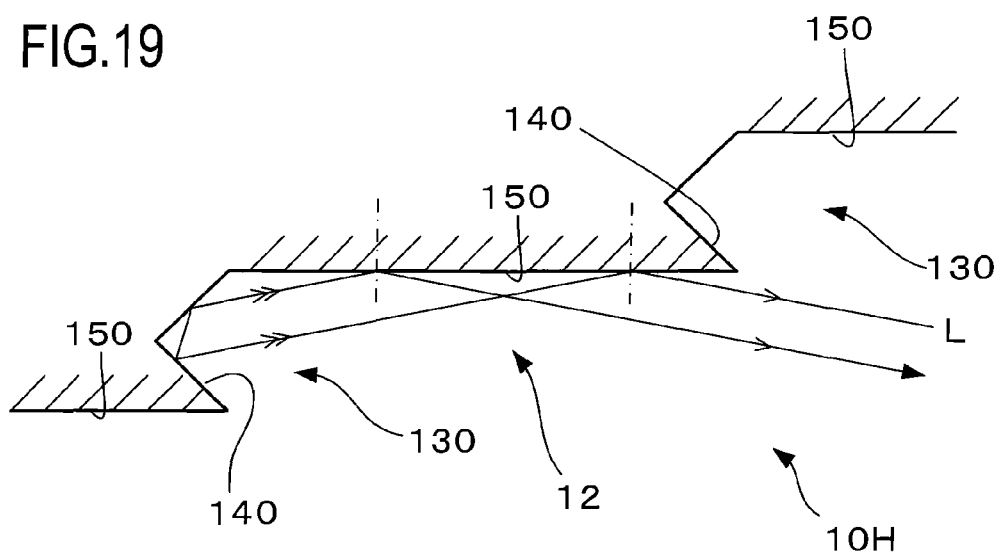
FIG. 19 illustrates a function of the target of FIG. 18.
Figure 20A:
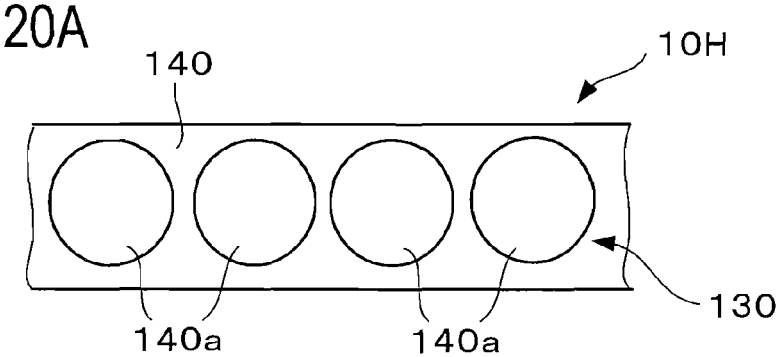
FIG. 20A illustrates a part of a reflective mechanism in which plural reflective parts each having a concave spherical surface and a circular rim part are arranged.
Figure 20B:
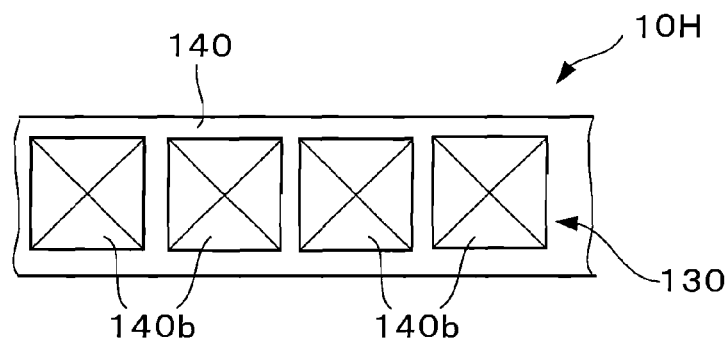
FIG. 20B illustrates a part of a reflective mechanism in which plural reflective parts each having a rectangular rim part are arranged.

With the target 10H of FIG. 18, even if the incident direction of the laser beam is deviated, the reflected light having enough intensity is returned by the reflective mechanism 140 in the direction parallel with the incident direction. The incident angle is limited in returning as a reflected light. However, even if the incident angle is largely deviated, the incident light L is reflected by the small reflective faces 150 to enter the reflective mechanism 140; and the light projected from the reflective mechanism 140 is reflected again by the small reflective faces 150 and returned in the direction parallel with the incident direction. Accordingly, the target 10H is more practical than the target 10, since the target 10H has a larger acceptable range of the incident angle than that of the target 10 shown in FIG. 3. Furthermore, as well as the structure shown in FIGS. 18 and 19, the structure of the reflective mechanism 140 may be configured by arranging numbers of reflective faces 140a which have a circular rim portion and a concaved spherical surface as shown in FIG. 20A, or by arranging numbers of reflective faces 140b which have a rectangular rim portion and combined from plural flat faces as shown in FIG. 20B.

Figure 21:
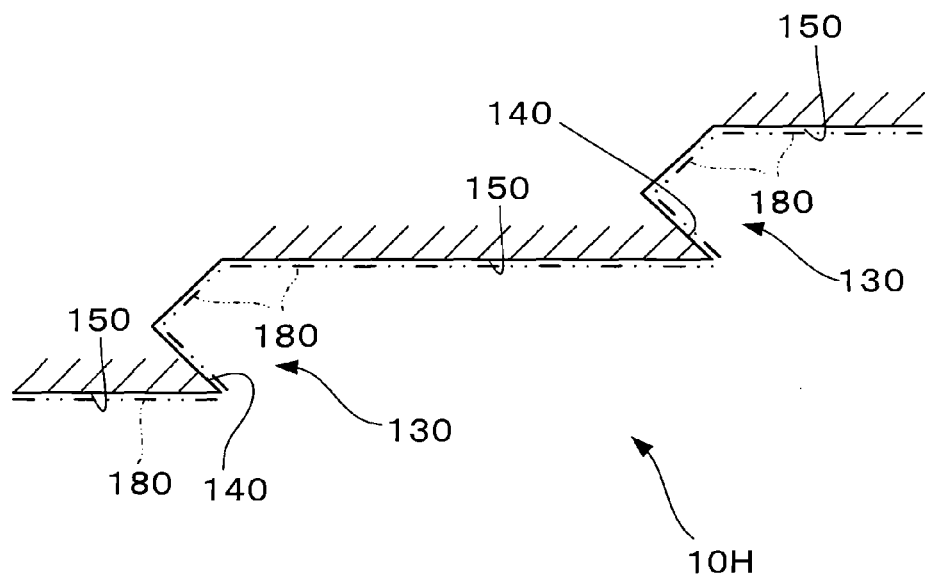
FIG. 21 illustrates a target in which a reflective layer is formed on each surface of the reflective mechanism and small flat faces of the target of FIG. 18.

Furthermore, a reflective layer 180 may be formed additionally on the surface of the reflective mechanism 140 and the surface of the respective small reflective face 150, as shown with the imaginary line in FIG. 21. By forming the reflective layer 180, the reflection efficiency for a laser beam can be enhanced. The reflective layer 180 may be formed, for example, by pasting a reflective tape, or applying paint. Furthermore, the reflective layer 180 may be formed by using various coating methods such as plating or spraying. Furthermore, when the target 10H is composed from metal material, the same function of the reflective layer 150 may be added to the target 10H by mirror finishing the surfaces of the reflective mechanism 140 and the small reflective faces 150.

Figure 13:
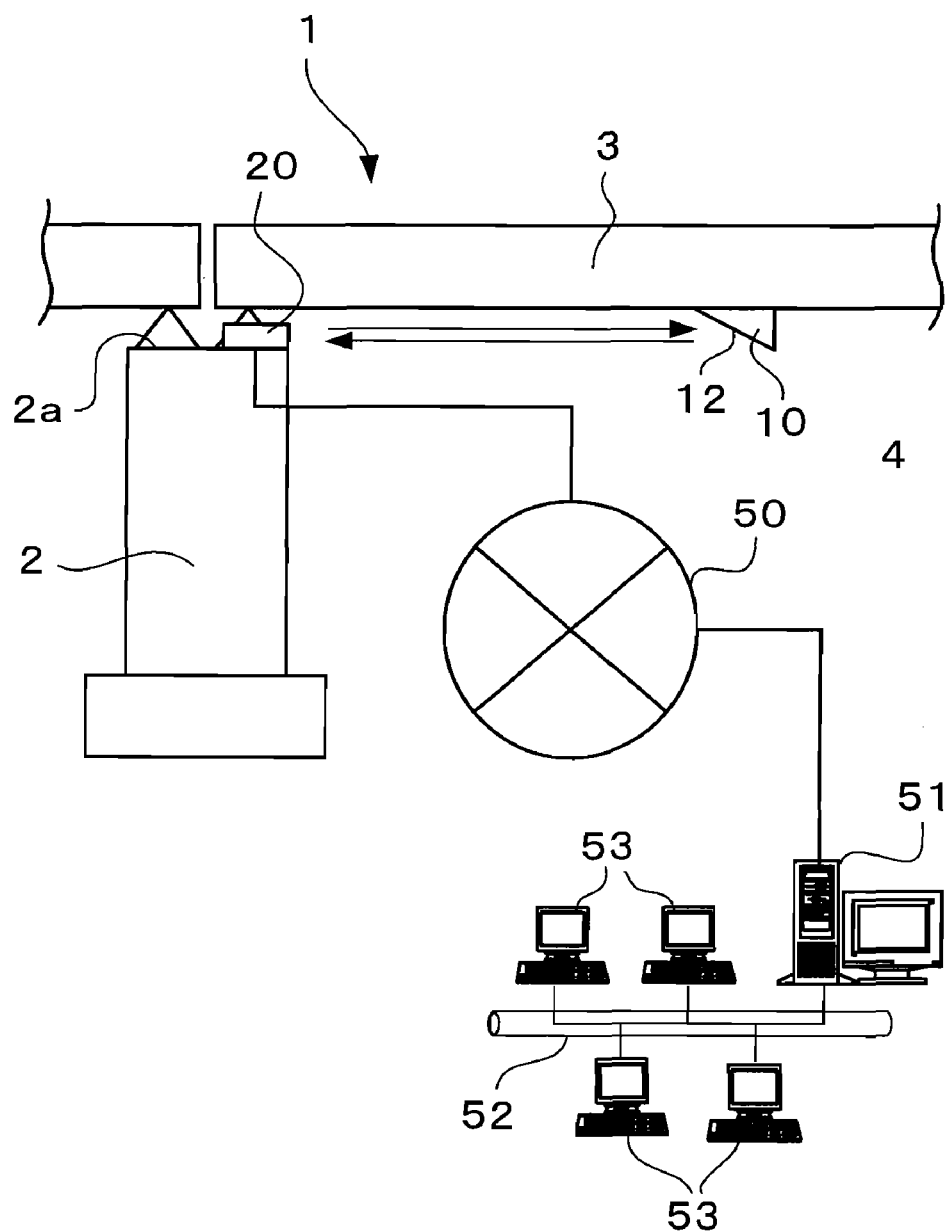
FIG. 13 illustrates an embodiment in which a laser rangefinder is connected to a network.

In the above configurations, the laser rangefinder 20 and the data processing instrument 31 are connected to each other via the wireless communication units 27 and 30. However, the scheme of connecting them is not limited to a wireless connection, and may be a wired connection. In the above configuration(s), the control unit 33 of the data processing instrument 31 is operated as the displacement calculating means. The control unit 25 may be operated as the displacement calculating means by converting the variation in the distance Ls to the deflection of the bridge girder 3 in the control unit 25 of the laser rangefinder 20. Furthermore, as shown in FIG. 13, the laser rangefinder 20 may be connected with a remote server 51 via the network 50. In this case, either the control unit 25 of the laser rangefinder 20, the server 51, or the terminal apparatus 53 connected with the server 51 via the LAN 52 can be operated as the displacement calculating means.

Figure 14:
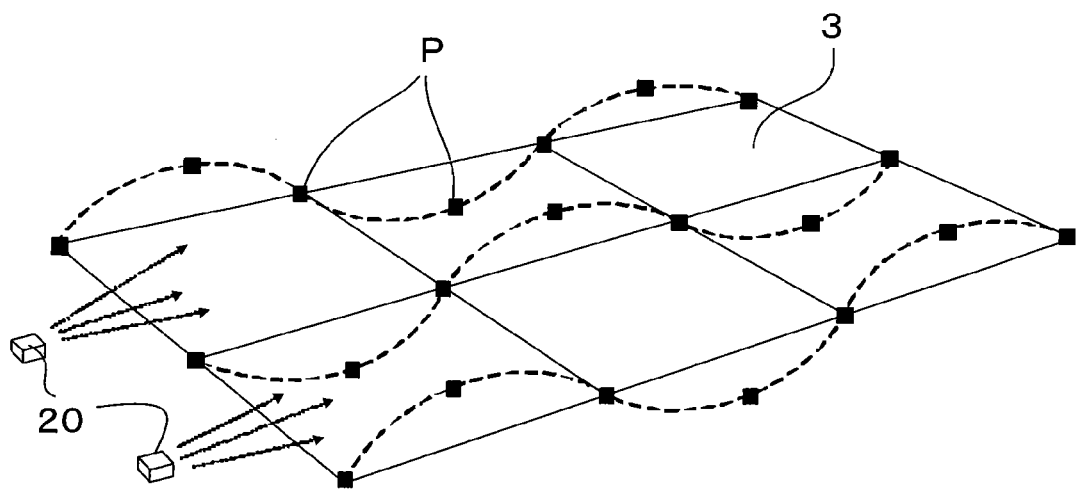
FIG. 14 illustrates an arrangement of the laser rangefinders for plural measuring object positions of the bridge girder.

In FIG. 9, the targets 10A and 10B and the auxiliary target 40 are located at the middle portion of the superstructure work 3 in the longitudinal direction, the displacements at the middle portion of the superstructure work 3 in the triaxial directions are measured. However, the displacement measuring position is not limited to the middle portion of the superstructure work 3, and may be located at a suitable position. Plural displacement measuring positions may be set on a same civil structure. For example, as shown in FIG. 14, the displacement of the each of the displacement measuring positions P may be measured at a same time by locating the target 10 (not shown in FIG. 14) at each of the displacement measuring positions P arranged in a matrix form on the bridge girder 3 (the black rectangular portion in the figure), and projecting laser beams from the plural (only two are shown in the figure) laser rangefinders 20 located on the upper end surface 2a of the bridge pier 2(see FIG. 1) to the respective targets 10. When the displacements of the plural displacement measuring positions P are measured at a same time in this manner, a torsional vibration mode or a displacement vibration mode of the superstructure work 3 can be detected. The soundness evaluation index of the civil structure can be obtained by estimating the variation in the stiffness of the civil structure (the superstructure work 3) or the existence of damages with measuring the time-variation in the vibration mode or the like. The target 10B or the auxiliary target 40 may be located at each of the displacement measuring positions P, in addition to or in stead of the target 10A of FIG. 9. The function of a movable bearing of the superstructure work 3 can also be evaluated by measuring the displacement of superstructure work 3 in the longitudinal direction utilizing the auxiliary target 40 (the target 10A can also be utilized), and checking the correlation between the displacement and the temperature.

Figure 15:
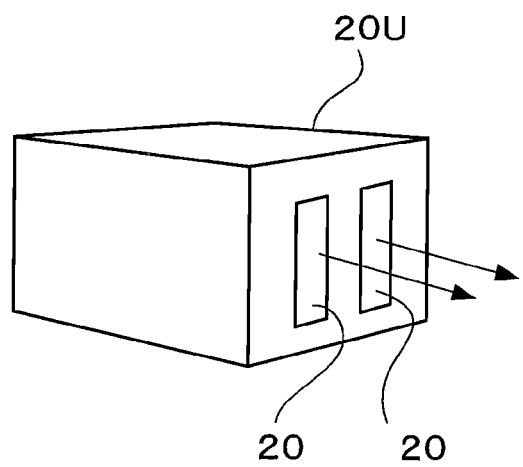
FIG. 15 illustrates an example of combining plural laser rangefinders into a unit.

Furthermore, in the case of FIG. 14, the target 10 at each of the positions P needs to be shifted somewhat in its position, so as not to block the laser beams to the other targets 10. When the laser beams are projected to the plural targets 10, 10A, 10B, or the auxiliary target 40 at a same time, as shown in FIG. 15, a rangefinder unit 20U which is configured to combine the plural laser rangefinders 20 in a unit may be used. With the use of such a rangefinder unit 20U, the work of locating the laser rangefinders can be reduced in comparison with the case of individually locating the laser rangefinder 20 for each of the plural targets. Furthermore, the unit is effective when the locating positions are restricted, since the footprint is expected to be reduced by the unitization.

Figure 22:
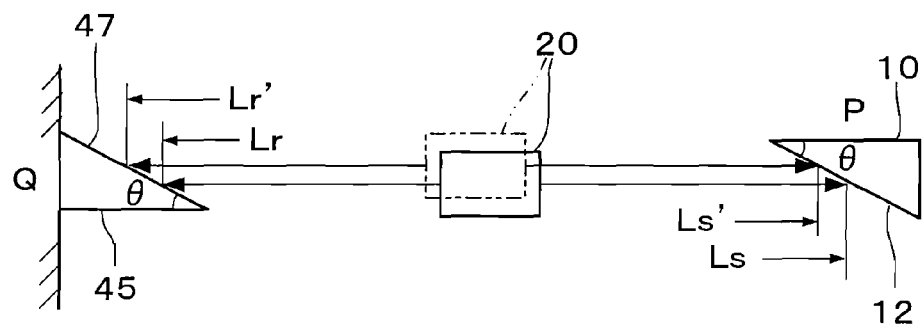
FIG. 22 illustrates a correction method of correcting error in the measuring.

In the above embodiment(s), errors are produced in the measuring when the laser rangefinder 20 is moved. Accordingly, the laser rangefinder 20 is configured to able to project a reference laser beam to a reference target 45 located at a stationary position Q as shown in FIG. 22. Output means can be provided to the laser rangefinder 20 thus configured, which can output a signal corresponding to the distance Lr from the laser rangefinder 20 to the reference target 45 (more properly, to the reflecting position of the reference laser beam on the reference target 45) or the variation in the distance Lr. Furthermore, some of the laser rangefinders 20 in the rangefinder unit 20U shown in FIG. 15 may be operated as such correction means. The reflective part 47 of the reference target 45 has a same structure as the reflective part 12 of the target 10 located at the displacement measuring position P. Furthermore, the reference target 45 is located at the stationary position Q such that the orientation of the reflective part 47 is opposite to the orientation of the reflective part 12 of the target 10. Namely, the reference target 45 is located at the stationary position Q such that the orientation of the reflective part 12 of the target 10 with reference to the incident direction of laser beam is opposite to the orientation of the reflective part 47 of the reference target 45 with respect to the reference incident direction of the laser beam. The method of computing the distance Lr and the variation in the distance Lr with the correction means may be same as the above-mentioned method of computing the distance Ls, thus the redundant description will be omitted.

When the laser rangefinder 20 is displaced with respect to the stationary position Q as shown with the imaginary line in FIG. 22, the distance Lr computed by the correction means is changed to Lr'. Accordingly, the displacement at the displacement measuring position P can be obtained with the errors corrected, by adding the displacement of the laser rangefinder 20, (Lr−Lr')tan θ, obtained by projecting the reference laser beam to the reference target 45 with the laser rangefinder 20 with the displacement, (Ls−Ls')tan θ, obtained by projecting the laser beam to the target 10 with the laser rangefinder 20. The procedure of computing the displacement with errors corrected may be suitably selected, for example, the variation X in the above equation (1) is computed in the following equation (2), and then the target displacement may be calculated using the equation (1). In this procedure, the displacement with the errors corrected can also be obtained.

$$X=(Ls-Ls')+(Lr-Lr') \quad (2)$$

Figure 23:
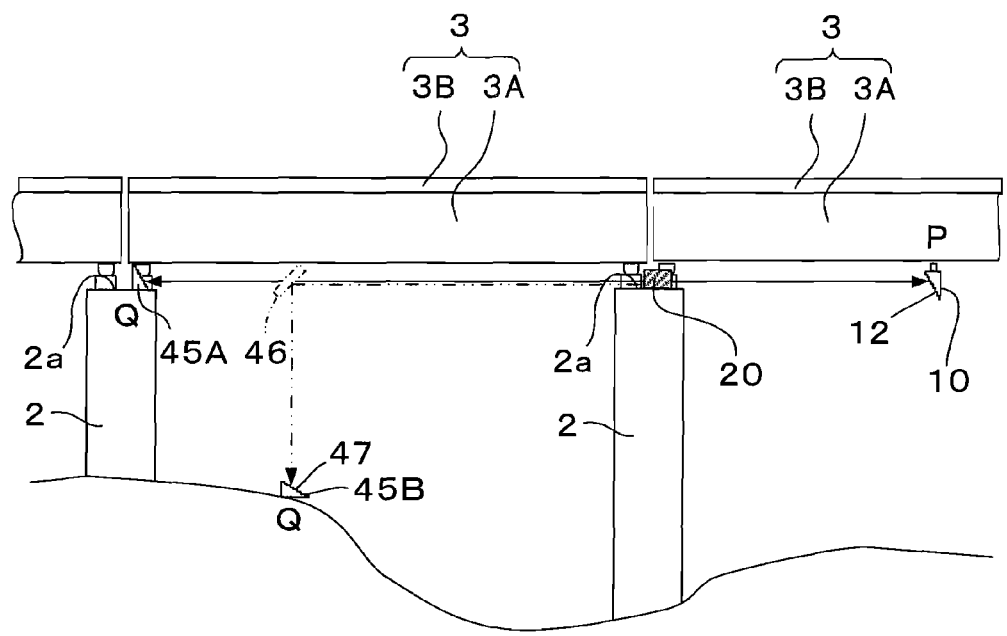
FIG. 23 illustrates an application of the correction method of FIG. 22 when the displacement of the bridge girder is measured with a laser rangefinder located at the top end of the bridge pier.

The stationary position Q, where the reference target 45 is located may be determined suitably, for example, it may be an arbitrary position on the ground. Furthermore, as shown in FIG. 23, when the displacement of the bridge girder 3A is measured with the laser rangefinder 20 located at the upper end part 2a of the bridge pier 2, and the reference target 45A may be located at the adjoining upper end part 2a of the bridge pier 2. Furthermore, as shown with the imaginary line of FIG. 23, the direction of the reference laser beam is changed with reflecting means such as a reflecting mirror 46, and a reference target 45B may be located at the stationary position Q (for example, on the ground) along the direction. In this case, the reference target 45B is located such that the orientation of the reflective part 47 is same as the orientation of the reflective part 12 of the target 10, since the reflecting mirror 46 exists in the beam path of the reference laser beam.

Figure 24:
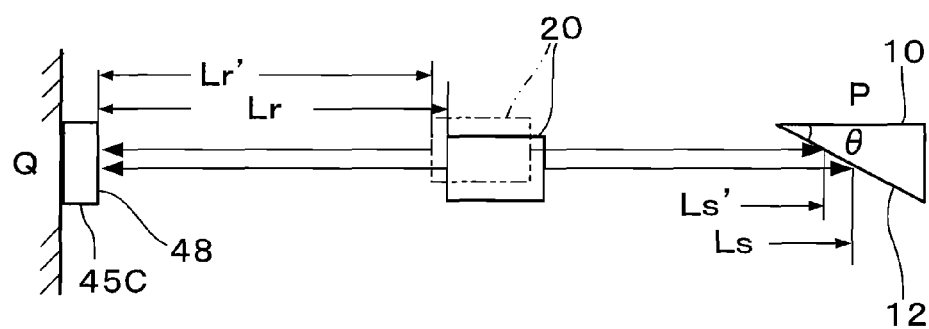
FIG. 24 illustrates a correction method using another reference target.
Figure 25:
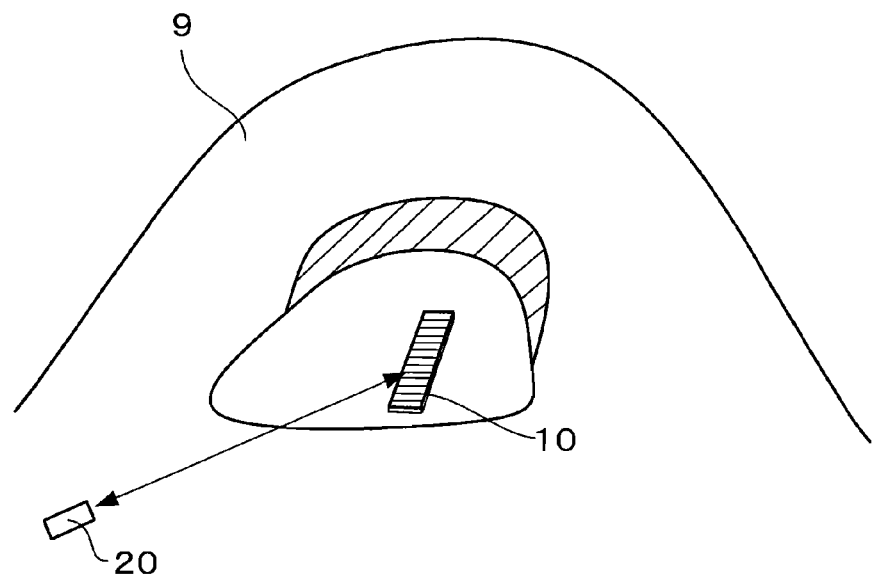
FIG. 25 illustrates locating conditions of a target and a laser rangefinder in a perspective view, when landslide of a mountain is to be detected in accordance with the present invention.
Figure 26:
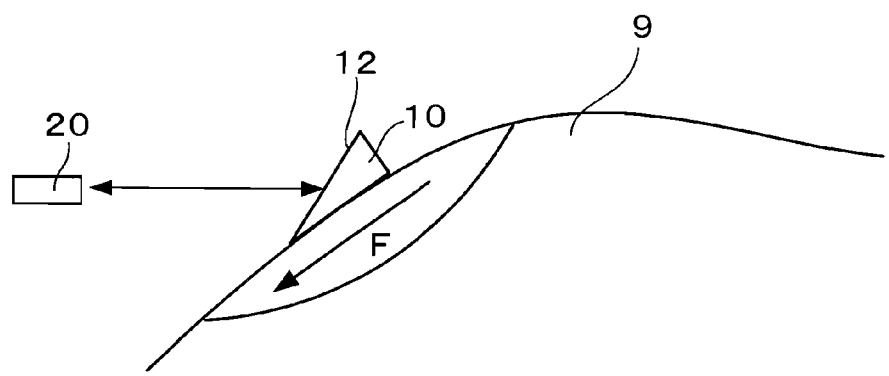
FIG. 26 illustrates a relation between the sliding direction of the slope area of the mountain and the tilt direction of the reflective part of the target, and the relation between the tilt direction of the reflective part of the target and the projecting direction of the laser beam of the laser rangefinder.

The reflective part 47 of the reference target 45 does not necessarily have the same structure as the reflective part 12 of the target 10 located at the displacement measuring position P. For example, the reference target 45 may be structured to have a reflective part 48 in a shape of a flat surface as the reference target 45C of FIG. 24. In this case, the reference target 45C is located at the stationary position Q, such that the reflective part 48 is near normal to the reference laser beam. Even in the case of using the reference target 45C, the errors in measurement can be corrected sufficiently as long as the laser rangefinder 20 is not deviated so much in the same direction as the displacement measuring direction.

Figure 16:
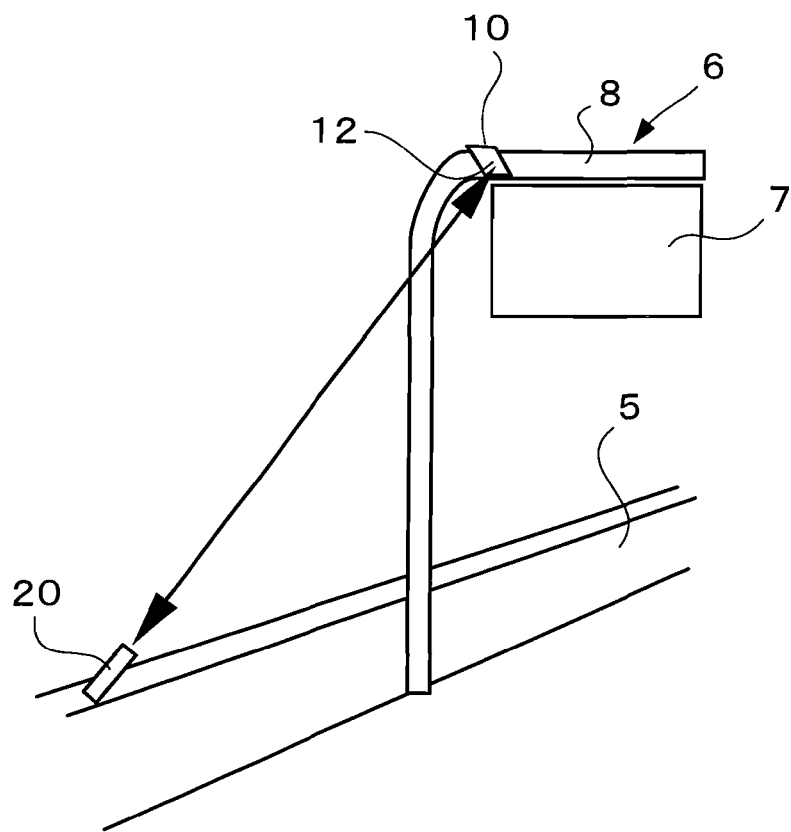
FIG. 16 illustrates an embodiment of the present invention in which the displacement of a road sign standing at a road side is measured.
Figure 27A:
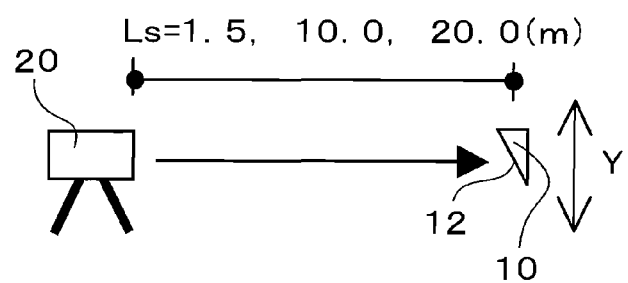
FIG. 27A illustrates a relation between a target and a laser rangefinder in an example of experiment of the present invention.
Figure 27B:
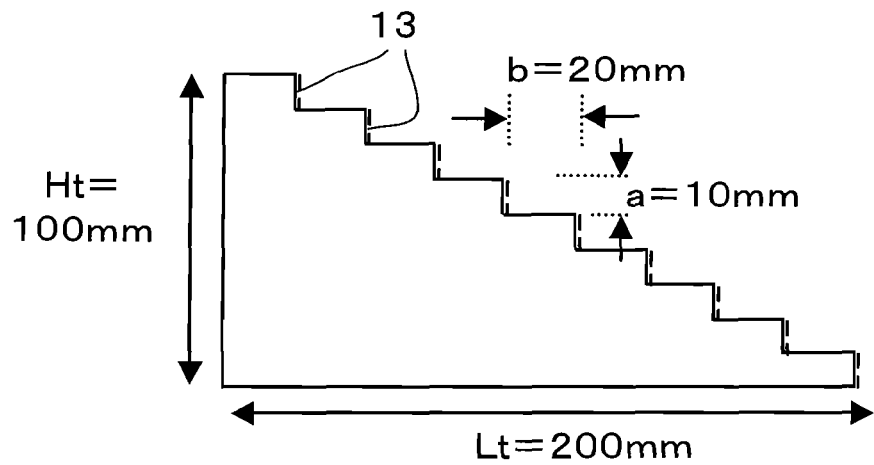
FIG. 27B illustrates details of a target in an example of experiment of the present invention.
Figure 28:
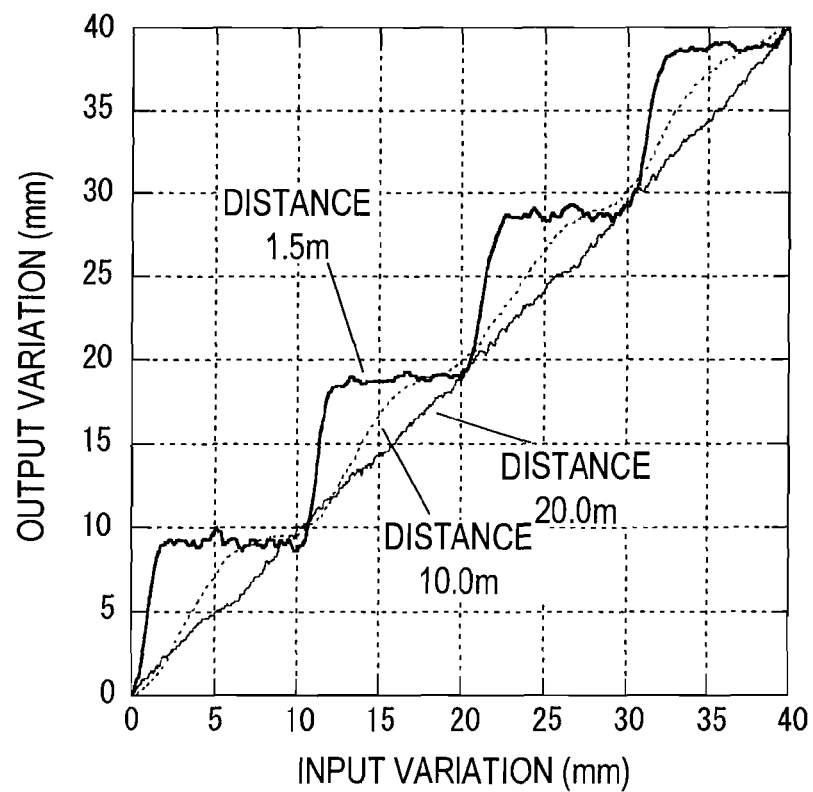
FIG. 28 illustrates a relation between the input displacement and the output displacement in the example of experiment.

The displacement measuring method of the present invention is not limited to the displacement measurement of the superstructure work 3 of the bridge 1, and can be applied for calculating the displacements of various civil structures. For example, as shown in FIG. 16, the target 10 is located at a supporting column 8 of a road sign structure 6 which hangs a road sign and is located at a road 5, and the laser rangefinder 20 may be located underneath the target 10. Since the laser rangefinder 20 does not also need to be located along the direction normal to the reflective part 12 of the target 10 in this case, the configuration has an advantage of having fewer restrictions in the locating position of the target 10 and the laser rangefinder 20 or the mounting orientation. Furthermore, the present invention is applicable for the displacement measurement of various civil structures, including beams or columns of various buildings, and amusement facilities such as a roller coaster. Furthermore, the measuring object applicable for the displacement measuring method of the present invention is not limited to the above-mentioned civil structure, but the method is applicable broadly to the displacement measurement of the landforms and land features. For example, as shown in FIG. 27, the target 10 is located on the slope of the mountain 9, and the laser rangefinder 20 may be located at the position apart from the mountain 9. With this method, the displacement of the landform, such as a landslide in the mountain 9 can be measured more rapidly in comparison with the measuring configuration utilizing a GPS, a photogrammetry, or the like. Furthermore, in a case that a skiing slope (Gelände) is formed on a slope of the mountain 9, a snowslide on the skiing slope can also be detected by locating the target 10 on the skiing slope and locating the laser rangefinder 20 at the position apart from the skiing slope. Furthermore, in these configurations, as shown in FIG. 28, the target 10 is preferably located such that the reflective part 12 of the target 10 is inclined with respect to the direction of a landslide and the direction of a snowslide, that is, the sliding direction F on the slope. Furthermore, the laser rangefinder 20 needs to be located at the position from which a laser beam can be made to impinge obliquely on the reflective part 12.

Furthermore, the laser rangefinder used in the present invention is not limited to the above-described structure, and other type of laser rangefinders can be suitably selected as long as the laser beam projecting direction is approximately same as the reflected light receiving direction. Furthermore, the laser rangefinder may be used which can control the beam diameter of a laser beam flexibly. By controlling the beam diameter, the laser beam having the beam diameter suitable for the target's structure can be projected to the target even if the distance to be measured is varied. Accordingly, the variation in the distance to be measured can be handled with this, without preparing plural types of targets each having a different structure of the reflective part from each other in accordance with the distance to be measured. The method for measuring the variation in the distance is also not limited to the above one and may be suitably modified, when the laser beams are projected to the plural small reflective faces.

Next, an example of experiment of measuring the displacement using the target 10 having the small reflective faces 13 is described. As shown in FIG. 27A, the target 10 and the laser rangefinder 20 are separately located by a distance Ls in the horizontal direction, and the target 10 is displaced by the displacement Y in the vertical direction as an input displacement for the target 10. The variation in the distance Ls corresponding to the displacement Y is detected by the laser rangefinder 20, and is converted to the displacement of the target 10 in the vertical direction in accordance with the above-mentioned equation (1). As an output displacement, the converted displacement is compared with the input displacement Y. The distance Ls at the input displacement Y=0 is varied in three steps of 1.5 m, 10.0 m, and 20.0 m. As shown in FIG. 27B, the length Lt of the target 10 in the horizontal direction is set to 200 mm, the height Ht of the target 10 in the vertical direction is set to 100 mm; and the height a of the small reflective faces 13 is set to 10 mm, and the shift amount b is set to 20 mm. The model DME2000 (SICK Co., ltd.) is used for the laser rangefinder 20.

FIG. 28 illustrates the experimental result. Since the beam diameter of a laser beam which impinges on the reflective part 12 of the target 10 increases to illuminate over the plural small reflective faces 13 as the distance Ls increases, it is understood that the output displacement is continuously varied in accordance with the input displacement. When the distance Ls is specifically set to 20.0 m, the input displacement and the output displacement show about the same values.

Furthermore, a target 101 having the small reflective faces 13 each of which is 1 mm in the height and 2 mm in the shift amount b, a target 102 having the small reflective faces 13 each of which is 5 mm in the height and 10 mm in the shift amount b, and a target 103 having the small reflective faces 13 each of which is 10 mm in the height and 20 mm in the shift amount b are prepared respectively. The respective target 101, 102, 103 is displaced by the displacement Y in the vertical direction as the input displacement for them in a similar manner to FIG. 27A. The variation in the distance Ls corresponding to the displacement Y is detected by the laser rangefinder 20 and converted to the displacement of the target 10 in the vertical direction in accordance with the above equation (1). As the output displacement, the converted displacement is compared, with the input displacement Y. It is assumed that the distance Ls has a constant value of 1.5 m at the input displacement Y=0.

Figure 29:
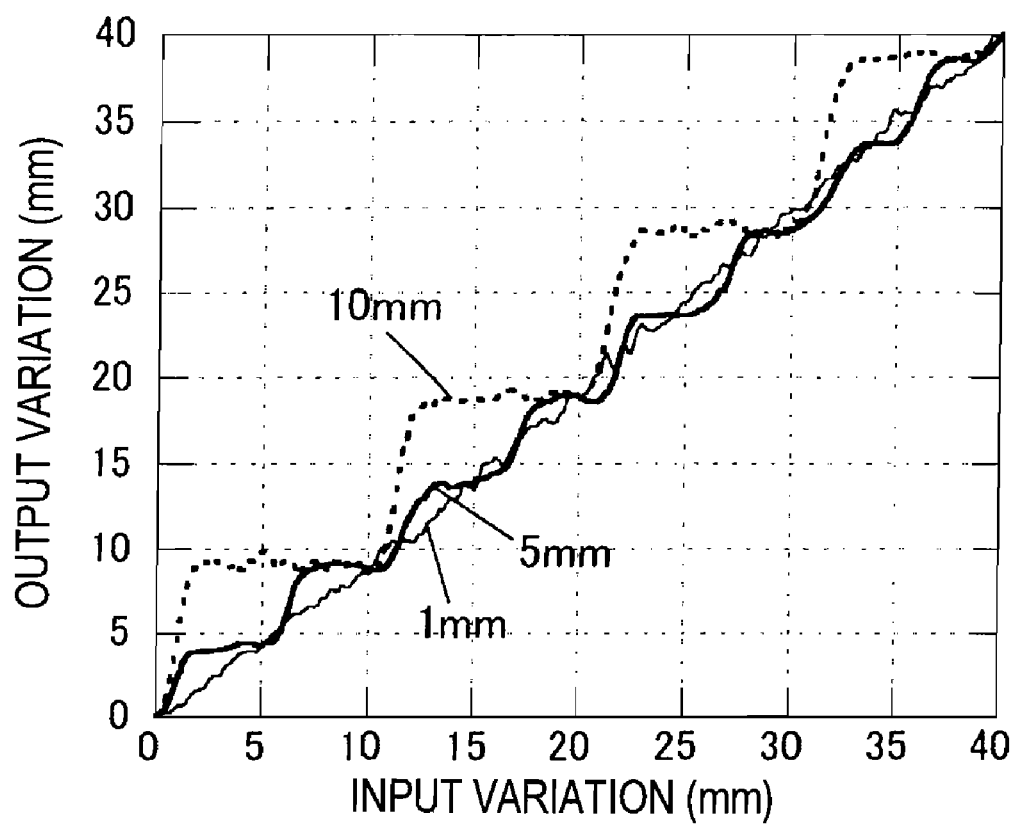
FIG. 29 illustrates a relation between the input displacement and the output displacement in another example.

FIG. 29 illustrates the experimental result. It is understood that the output displacement is continuously varied in accordance with the input displacement, since, as long as the height a of the small reflective faces 13 is in the order of 1 mm, the laser beam will illuminate over plural small reflective faces 13 even if the beam diameter of a laser beam stays constant.

It is noted that the above-described experiment has been performed to confirm that the displacement (the deflection), that is the measuring object, can be measured continuously in a case of using the staircase-shape target 10. It is apparent that the laser rangefinder and the range of the distance Ls or the like used in the experiment are illustrative purpose only, and the present invention is not limited within the range used in the above experimental example.

The invention claimed is:

1. A displacement measuring method, comprising the steps of:
locating a target having a reflective part for a laser beam at a measuring object position of a measuring object such that the reflective part is obliquely inclined with respect to a displacement measuring direction;
locating a laser rangefinder at a position which is relatively displaced in the displacement measuring direction relative to the measuring object position;
making a laser beam projected from the laser rangefinder to impinge obliquely on the reflective part along a different direction than the displacement measuring direction;
with the laser rangefinder, receiving the reflected light returned from the reflective part in the direction generally parallel with the impinging direction of the laser beam;
detecting a variation in the distance from the laser rangefinder to the laser beam reflecting position reflective part; and
measuring the displacement of the displacement measuring object position in the displacement measuring direction by utilizing correlation between the detected variation and the displacement of the measuring object position in the displacement measuring direction, wherein
plural small reflective faces which are generally orthogonal to the impinging direction of the laser beam are formed at the reflective part with their positions shifted successively in the impinging direction, and
a beam diameter of the laser beam is set larger than a height of the respective small reflective faces such that the laser beam impinges on the plural small reflective faces of the reflective part at a same time, and the reflected lights from the respective small reflective faces are received with the laser rangefinder.

2. A displacement measuring method, comprising the steps of:
locating a target having a reflective part for a laser beam at a measuring object position of a measuring object such that the reflective part is obliquely inclined with respect to a displacement measuring direction;
locating a laser rangefinder at a position which is relatively displaced in the displacement measuring direction relative to the measuring object position;
making a laser beam projected from the laser rangefinder to impinge obliquely on the reflective part along a different direction than the displacement measuring direction;
with the laser rangefinder, receiving the reflected light returned from the reflective part in the direction generally parallel with the impinging direction of the laser beam;
detecting a variation in the distance from the laser rangefinder to the laser beam reflecting position reflective part; and
measuring the displacement of the displacement measuring object position in the displacement measuring direction by utilizing correlation between the detected variation and the displacement of the measuring object position in the displacement measuring direction,
wherein the laser rangefinder is able to project a reference laser beam which differs from the laser beam, and further comprising the steps of:
locating a reference target having a reflective part for the reference laser beam at a predetermined stationary position which differs from the measuring object position;
making the reference laser beam projected from the laser rangefinder to impinge on the reference target;
with the laser rangefinder, receiving the reflected light returned from the reflective part of the reference target in the direction generally parallel with the impinging direction of the reference laser beam;
measuring the distance from the laser rangefinder to the laser beam reflecting position of the reflective part of the reference target; and
measuring the displacement of the measuring object position in the displacement measuring direction by taking account of the measured distance.

3. The displacement measuring method according to claim 2, wherein the reflective part of the reference target and the reflective part of the target have a same structure, and comprising:
locating the reference target at the stationary position, such that the orientation of the reflective part of the reference target with respect to the impinging direction the reference laser beam and the orientation of the reflective part of the target with respect to the impinging direction the reference laser beam are opposite to each other.

4. A displacement measuring method, comprising the steps of:
locating a target having a reflective part for a laser beam at a measuring object position of a measuring object such that the reflective part is obliquely inclined with respect to a displacement measuring direction;

locating a laser rangefinder at a position which is relatively displaced in the displacement measuring direction relative to the measuring object position;

making a laser beam projected from the laser rangefinder to impinge obliquely on the reflective part along a different direction than the displacement measuring direction;

with the laser rangefinder, receiving the reflected light returned from the reflective part in the direction generally parallel with the impinging direction of the laser beam;

detecting a variation in the distance from the laser rangefinder to the laser beam reflecting position reflective part; and measuring the displacement of the displacement measuring object position in the displacement measuring direction by utilizing correlation between the detected variation and the displacement of the measuring object position in the displacement measuring direction, wherein the measuring object is a superstructure work bridged between plural bridge piers or plural bridge abutments, the displacement measuring direction is orthogonal to the longitudinal direction of the superstructure work, the target is located at the superstructure work, such that the reflective part of the target is obliquely inclined with respect to both the longitudinal direction and the vertical direction of the superstructure work, and the laser rangefinder is located at the bridge pier or the bridge abutment, such that a laser beam impinges on the target along the longitudinal direction of the superstructure work.

5. The displacement measuring method according to claim 4, further comprising:

locating an auxiliary target having a reflective part orthogonal to the impinging direction of the laser beam at the measuring object position;

at the same time of measuring the displacement in the displacement measuring direction, measuring the displacement of the measuring object position in the impinging direction by making a laser beam to impinge on the reflective part of the auxiliary target from the same direction as the impinging direction for the target.

6. A displacement measuring instrument, comprising:

a target having a reflective part for a laser beam, the reflective part being obliquely inclined with respect to a displacement measuring direction when the reflective part is positioned at a measuring object position of a measuring object, and plural small reflective faces are formed at the reflective part with their positions shifted successively from one end to the other end of the reflective part in a specific direction; and a laser rangefinder which is located at a position relatively displaced in the displacement measuring direction with respective to the measuring object position, makes a laser beam to impinge on the reflective part along a direction near normal to the small reflective faces of the reflective part, receives the reflected light returned from the small reflective faces of the reflective part in the direction generally parallel with the impinging direction of the laser beam, measures the displacement of the displacement measuring object position in the displacement measuring direction by utilizing correlation between the variation in the distance to the laser beam reflecting position and the displacement of the measuring object position in the displacement measuring direction, and outputs a signal corresponding to the measured variation in the distance, the beam diameter of the laser beam being set larger than a height of the respective small reflective faces such that the laser beam impinges on the plural small reflective faces of the reflective part at a same time.

7. The displacement measuring instrument according to claim 6, further comprising a reference target having a reflective part for a laser beam, wherein the laser rangefinder is configured to be able to project a reference laser beam which differs than the laser beam, and is located at a predetermined stationary position differing than the measuring object position, and the laser rangefinder includes means for receiving the reflected light returned from the reflective part of the reference target in the direction generally parallel with the impinging direction of the reference laser beam, correcting errors due to the movement of the laser rangefinder by utilizing a variation in a signal corresponding to a distance to the reference laser beam reflecting position, and outputting a signal corresponding to the corrected variation in the displacement measuring direction.

8. The displacement measuring instrument according to claim 7, wherein the reflective part of the reference target and the reflective part of the target have a same structure, the reference target is located at the stationary position, such that the orientation of the reflective part of the reference target with respect to the impinging direction of the reference laser beam and the orientation of the reflective part of the target with respect to the impinging direction of the reference laser beam are opposite to each other.

9. The displacement measuring instrument according to claim 6, wherein an auxiliary target having a reflective part orthogonal to the impinging direction of the laser beam is located at the measuring object position, and the displacement measuring instrument further comprising a laser rangefinder which makes a laser beam to impinge on the auxiliary target from the same direction as the impinging direction for the target.

* * * * *